US012626566B2

(12) United States Patent
Nagale et al.

(10) Patent No.: US 12,626,566 B2
(45) Date of Patent: May 12, 2026

(54) SYSTEM AND METHOD FOR PROVIDING EMERGENCY ALERTS USING MULTI-COLOR LIGHT EMITTING DIODE NOTIFICATION APPLIANCES

(71) Applicant: Johnson Controls Tyco IP Holdings LLP, Milwaukee, WI (US)

(72) Inventors: Siddhesh K. Nagale, Maharashtra (IN); Sandip Shelar, Maharashtra (IN); Joseph Piccolo, Westminister, MA (US); Sonali Mahendra Date, Maharashtra (IN); Bruce W. Marien, Fitchburg, MA (US)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 126 days.

(21) Appl. No.: 18/303,405

(22) Filed: Apr. 19, 2023

(65) Prior Publication Data

US 2023/0290233 A1 Sep. 14, 2023

Related U.S. Application Data

(63) Continuation-in-part of application No. 18/181,404, filed on Mar. 9, 2023.

(30) Foreign Application Priority Data

Mar. 9, 2022 (IN) ............................ 202221012712

(51) Int. Cl.
*G08B 5/36* (2006.01)
*G08B 3/10* (2006.01)

(52) U.S. Cl.
CPC .................................... *G08B 5/36* (2013.01); *G08B 3/10* (2013.01)

(58) Field of Classification Search
CPC .................................. G08B 5/36; G08B 3/10
See application file for complete search history.

(56) References Cited

U.S. PATENT DOCUMENTS 7,800,511 B1 * 9/2010 Hutchison .............. G08B 7/066 340/3.1
8,183,989 B2 * 5/2012 Tsai ...................... H05B 47/19 340/506

(Continued)

FOREIGN PATENT DOCUMENTS

CN 105185021 B * 6/2017
CN 108096724 A 6/2018

(Continued)

*Primary Examiner* — Steven Lim
*Assistant Examiner* — James E Munion
(74) *Attorney, Agent, or Firm* — ArentFox Schiff LLP

(57) ABSTRACT

A system for providing emergency alerts is provided. The system includes a plurality of sensors, a plurality of notification appliances, and processing circuitry. Each sensor monitors at least one parameter of a space and generates sensed data. Each notification appliance is operable to emit light in a plurality of colors. The processing circuitry detects, based on the sensed data, that at least one event among a plurality of events has occurred in the space, and determines a first evacuation path from the space that bypasses a location of the detected event. The processing circuitry further operates the plurality of notification appliances to emit light in a color assigned to the detected event among the plurality of colors and provide direction guidance for the first evacuation path. The direction guidance for the first evacuation path is provided by controlling one or more characteristics of the emitted light.

3 Claims, 15 Drawing Sheets

(56) References Cited

U.S. PATENT DOCUMENTS

| | | | | |
|---|---|---|---|---|
| 8,970,354 | B2 * | 3/2015 | Lewis | G08B 7/066 340/815.4 |
| 9,689,542 | B2 * | 6/2017 | Anderson | G08B 7/066 |
| 9,922,509 | B2 * | 3/2018 | Marien | G09B 21/009 |
| 10,565,859 | B2 | 2/2020 | Gravel et al. | |
| 10,977,920 | B2 | 4/2021 | Nelson et al. | |
| 11,043,095 | B1 * | 6/2021 | Derickson | G08B 31/00 |
| 11,176,788 | B2 * | 11/2021 | Tran | G08B 7/062 |
| 11,282,350 | B2 * | 3/2022 | Anderson | G01J 5/0018 |
| 11,887,468 | B2 * | 1/2024 | Williams | G08B 7/066 |
| 2005/0286247 | A1 * | 12/2005 | Peterson | G08B 7/066 362/153 |
| 2007/0152808 | A1 | 7/2007 | Lacasse | |
| 2010/0245083 | A1 * | 9/2010 | Lewis | G08B 7/066 340/517 |
| 2012/0047083 | A1 | 2/2012 | Qiao et al. | |
| 2013/0147604 | A1 | 6/2013 | Jones et al. | |
| 2013/0169817 | A1 * | 7/2013 | Jones | G08B 25/14 340/539.2 |
| 2015/0248832 | A1 | 9/2015 | Piccolo et al. | |
| 2017/0091998 | A1 | 3/2017 | Piccolo, III | |
| 2018/0114430 | A1 | 4/2018 | Westmacott et al. | |
| 2019/0295397 | A1 * | 9/2019 | Eckert | G08B 5/36 |
| 2020/0080739 | A1 | 3/2020 | Koss et al. | |
| 2021/0043053 | A1 * | 2/2021 | Kronz | H04W 4/38 |
| 2021/0158670 | A1 * | 5/2021 | Derickson | G08B 7/066 |
| 2021/0193336 | A1 * | 6/2021 | Nemeth | G08B 7/066 |
| 2021/0241595 | A1 | 8/2021 | Young et al. | |
| 2021/0335107 | A1 * | 10/2021 | Wedig | G08B 21/22 |
| 2022/0262212 | A1 | 8/2022 | Williams | |
| 2023/0052031 | A1 | 2/2023 | Kumagawa et al. | |

FOREIGN PATENT DOCUMENTS

| | | | | | |
|---|---|---|---|---|---|
| CN | 108806140 | B | | 10/2020 | |
| CN | 114463907 | A | | 5/2022 | |
| GB | 2609512 | A | * | 2/2023 | G08B 21/22 |
| IN | 202411017444 | A | | 4/2024 | |
| IT | 102020000024148 | B1 | | 11/2022 | |
| JP | 06-243361 | A | | 9/1994 | |
| JP | 2515390 | B2 | | 7/1996 | |
| JP | 08-212811 | A | | 8/1996 | |
| JP | 3518634 | B2 | | 4/2004 | |
| JP | 2014-170261 | A | | 9/2014 | |
| JP | 2014-178819 | A | | 9/2014 | |
| JP | 2014-182709 | A | | 9/2014 | |
| KR | 10-2009-0044625 | A | | 5/2009 | |
| KR | 20-2010-0003443 | U | | 3/2010 | |
| KR | 10-2025-0042007 | A | | 3/2025 | |
| NL | 2002295 | C2 | * | 12/2009 | G08B 7/066 |
| RU | 2760114 | C1 | * | 11/2021 | A62B 3/00 |
| WO | WO-2008076715 | A1 | * | 6/2008 | G08B 17/00 |
| WO | 2017/117674 | A1 | | 7/2017 | |
| WO | WO-2021144576 | A1 | * | 7/2021 | G06Q 90/205 |

* cited by examiner

SYSTEM AND METHOD FOR PROVIDING EMERGENCY ALERTS USING MULTI-COLOR LIGHT EMITTING DIODE NOTIFICATION APPLIANCES

CROSS-REFERENCE TO RELATED APPLICATION

This application is a Continuation-In-Part of application Ser. No. 18/181,404, filed Mar. 9, 2023, which claims priority to Indian Patent Application No. 202221012712, filed Mar. 9, 2022, the disclosures of which are hereby incorporated by reference in their entireties.

BACKGROUND

The present disclosure relates generally to notification systems. More particularly, the present disclosure relates to systems and methods for providing emergency alerts using multi-color light emitting diode (LED) notification appliances.

Nowadays a variety of notification appliances are available on the market. The main objective of these notification appliances is to notify users or occupants of a building of a particular event (for example, an emergency). The most commonly used notification appliance is a visual indicator. When activated, the visual indicator illuminates as a warning for individuals within the area. However, these visual indicators emit light in single color, which makes it difficult for a user to understand the cause of the warning. Therefore, different visual indicators, either housed in a single housing or separate housings, emitting different colors are used to warn users of different events, for example, red colored strobe for fire warning, amber colored strobe for mass notification, blue colored strobe for carbon monoxide leak, etc. Further, these visual indicators make use of Xenon bulbs which consume high current and have short life span.

Though these notification appliances warn users regarding the emergency situation, they fail to provide any evacuation route guidance to the users. Typically, these buildings have pre-set evacuation plans for guiding building occupants towards safe exit in case of emergency. These pre-set evacuation routes generally include static or digital signage boards to inform building occupants of primary and alternate emergency exit routes. However, these conventional solutions fail to adapt according to dynamically changing emergency situations, for example, fire spreading to different area, gunshot suspect being on the move, etc. In other words, the existing systems merely indicate the presence of an emergency situation and occupants rely on pre-set evacuation paths for evacuation.

In light of the foregoing, there exists a need for notification systems the overcome the abovementioned problems by indicating the type of emergency event and providing dynamic evacuation path guidance.

SUMMARY

One implementation of the present disclosure relates to a system for providing emergency alerts. The system comprises a plurality of sensors, a plurality of notification appliances, and processing circuitry. Each sensor among the plurality of sensors is configured to monitor at least one parameter of a space and generate sensed data. Each notification appliance among the plurality of notification appliances is operable to emit light in a plurality of colors. The processing circuitry is configured to detect, based on the sensed data, that at least one event among a plurality of events has occurred in the space. The processing circuitry is further configured to determine a first evacuation path from the space that bypasses a location of the detected event. The processing circuitry is further configured to operate the plurality of notification appliances to emit light in a color assigned to the detected event among the plurality of colors and provide direction guidance for the first evacuation path. The direction guidance for the first evacuation path is provided by controlling one or more characteristics of the emitted light.

In some embodiments, each of the plurality of events is assigned a different color among the plurality of colors for event indication.

In some embodiments, the first evacuation path leads away from the location of the detected event to at least one of a safe shelter and an exit location of the space.

In some embodiments, the one or more characteristics of the emitted light comprises at least one of an intensity level, a blinking rate, a flashing pattern, and a projection direction of the emitted light.

In some embodiments, the plurality of events include fire, gunshot, earthquake, flood, oxygen deficiency, gas leak, and breaking and entering.

In some embodiments, the at least one parameter includes at least one of temperature, smoke, oxygen levels, pressure, occupancy state, humidity, sound, motion, real-time video, and real-time images.

In some embodiments, the processing circuitry is further configured to determine the location of the detected event based on the sensed data and locations of one or more sensors among the plurality of sensors that generated the sensed data.

In some embodiments, each of the plurality of notification appliances comprises at least one RGB light emitting diode configured to emit light in the plurality of colors.

In some embodiments, the plurality of notification appliances are based on addressable communication protocol.

In some embodiments, the processing circuitry is further configured to dynamically monitor the sensed data generated by the plurality of sensors subsequent to the detection of the event. The processing circuitry is further configured to detect a spread or shift of the detected event to one or more other locations in the space based on the dynamic monitoring of the sensed data, and determine a second evacuation path from the space based on any of the one or more other locations to which the detected event has spread or shifted being located in the first evacuation path. The processing circuitry is further configured to dynamically operate the plurality of notification appliances to provide direction guidance for the second evacuation path instead of the direction guidance for the first evacuation path.

In some embodiments, the second evacuation path bypasses the one or more other locations to which the detected event has spread or shifted.

In some embodiments, the second evacuation path further bypasses the location at which the event was initially detected.

In some embodiments, the second evacuation path includes the location at which the event was initially detected when the detected event has shifted to the one or more other locations and is no longer detectable at the location.

In some embodiments, the processing circuitry is further configured to apply one or more prediction models to the dynamically monitored sensed data to predict the spread or shift of the detected event to the one or more other locations in the space.

In some embodiments, each of the plurality of notification appliances are further configured to emit light in the color such that the emitted light forms one of a pattern or a symbol indicating the detected event.

In some embodiments, the plurality of notification appliances are further operable to emit one or more audio outputs in synchronization with the emitted light for direction guidance.

In some embodiments, the processing circuitry is further configured to operate the plurality of notification appliances to provide an unsafe area warning in areas that are proximal to the location of the detected event.

Another implementation of the present disclosure relates to a method for providing emergency alerts. The method includes detecting, by processing circuitry, based on sensed data generated by a plurality of sensors in a space, that at least one event among a plurality of events has occurred in the space. The method further includes determining, by the processing circuitry, a first evacuation path from the space that bypasses a location of the detected event. The method further includes operating, by the processing circuitry, a plurality of notification appliances installed in the space to emit light in a color assigned to the detected event among the plurality of colors and provide direction guidance for the first evacuation path. The direction guidance for the first evacuation path is provided by controlling one or more characteristics of the emitted light.

Another implementation of the present disclosure relates to a multi-colored notification appliance installed in a space for providing emergency alerts. The multi-colored notification appliance comprises at least one RGB light emitting diode and a control circuit coupled to the at least one RGB light emitting diode. The at least one RGB light emitting diode is operable to emit light in a plurality of colors. The control circuit is configured to receive one or more commands from a control apparatus in response to the control apparatus detecting that at least one event among a plurality of events has occurred in the space. The control circuit is further configured to control, in response to the one or more commands, the at least one RGB light emitting diode to emit light in one of the plurality of colors assigned to the at least one event among the plurality of events. The control circuit is further configured to modulate one or more characteristics of the emitted light to provide direction guidance for an evacuation path from the space.

In some embodiments, the multi-colored notification appliance further includes an audio generator operable to emit one or more audio outputs. The control circuit is further configured to control the audio generator to emit the one or more audio outputs in synchronization with the emitted light for direction guidance.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Overview

As discussed above, improvements are desired in existing emergency notification systems. To this end, a system and a method for providing emergency alerts in accordance with the present disclosure will now be described more fully hereinafter with reference to the accompanying drawings. In some examples, the system and method may be used to provide indication regarding a type of emergency event and direction guidance to occupants for evacuating an unsafe area. The system of the present disclosure uses multi-color light emitting diode (LED) notification appliances for providing the emergency alerts.

In the event of an emergency, depending on the type of the emergency, a nearest exit to an occupant may not be the safest exit to escape. The system of the present disclosure takes the location of the detected event into consideration and generates shortest and safest evacuation paths for occupants to escape. The system of the present disclosure may avoid the need for occupants to locate the exit. The direction guidance indicated by modulated characteristics of emitted light may guide the occupants through the evacuation path to the exit.

The system and method may be utilized for different kinds of buildings (e.g., auditoriums, hospitals, office spaces, etc.). The system and method may also be used for one or more open areas or in combination of open spaces and closed buildings.

Referring generally to the Figures, method and systems for providing emergency alerts using multi-color light emitting diode notification appliances are shown and described.

Building Management System

Figure 1:
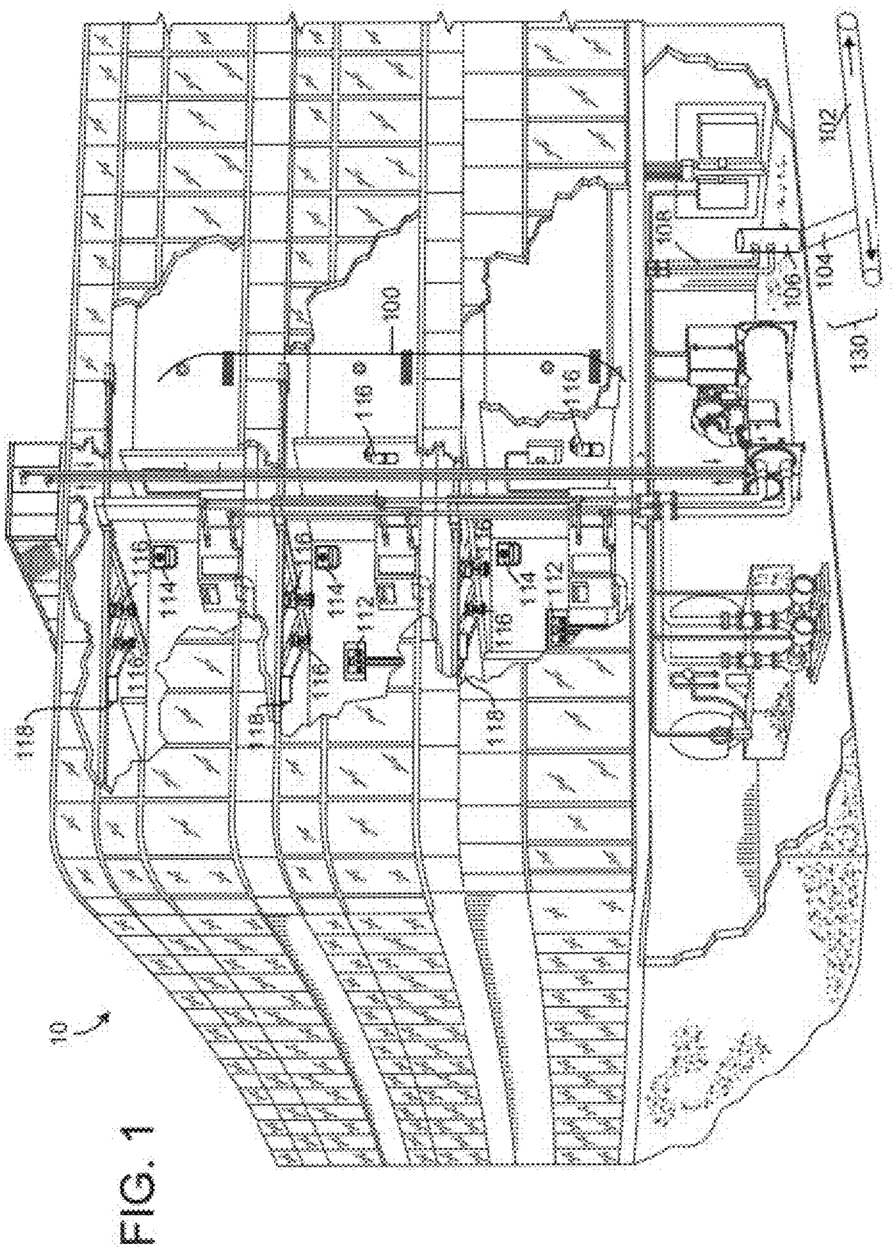
FIG. 1 is a drawing of a perspective view of a building equipped with a building management system (BMS), according to some embodiments of present disclosure.
Figure 2:
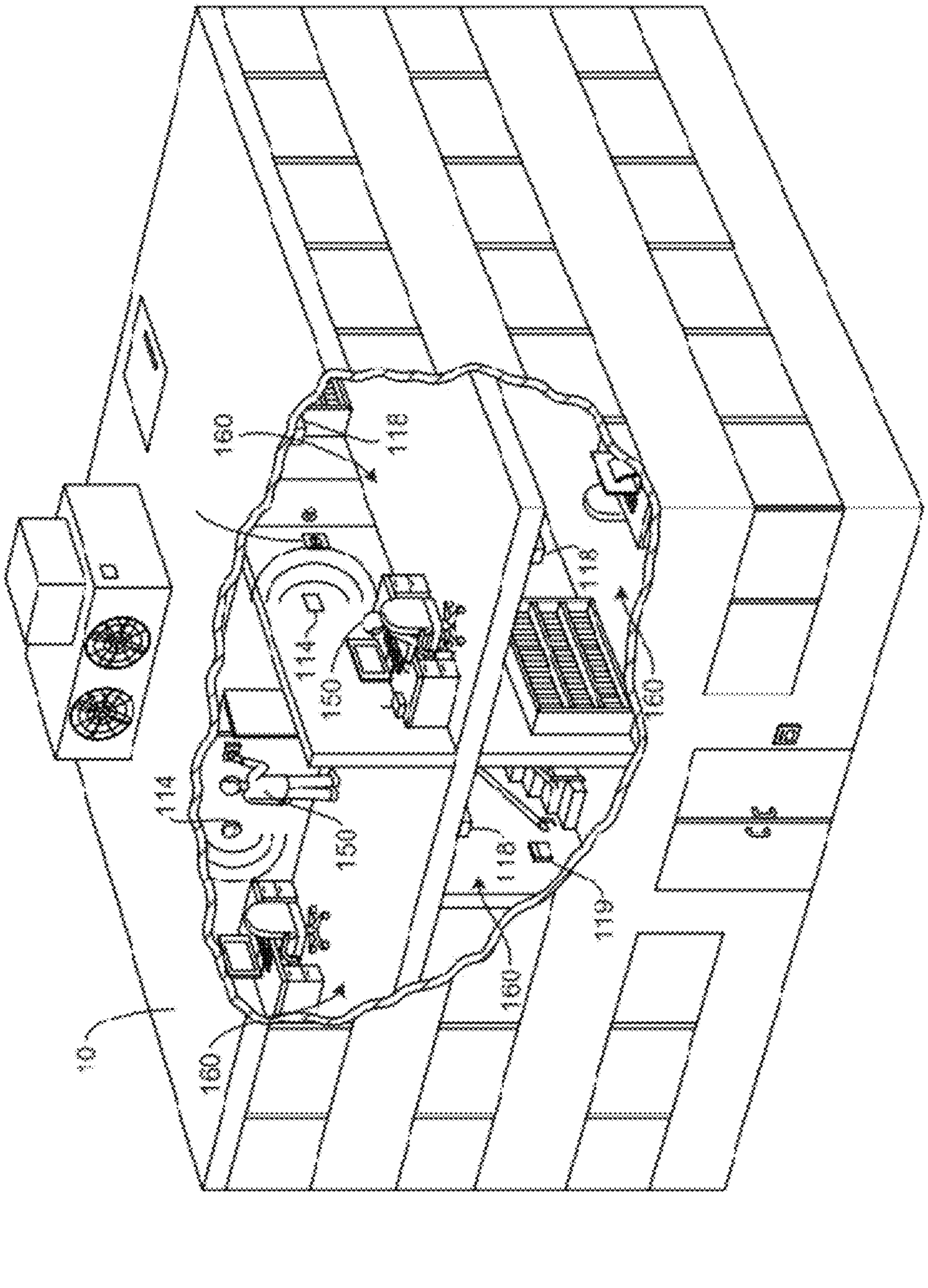
FIG. 2 is a block diagram of a BMS that serves the building of FIG. 1, according to some embodiments of present disclosure.

Referring now to FIGS. 1-4, a building management system (BMS) and fire suppression system are shown, according to some embodiments. Referring particularly to FIG. 1, a drawings of a perspective view of a building 10 equipped with a building management system (BMS) is shown, according to some embodiments of present disclosure. Referring particularly to FIG. 2, a block diagram of a BMS that serves the building 10 is shown, according to some embodiments of present disclosure.

A BMS is, in general, a system of devices configured to control, monitor, and manage equipment in or around a building or building area, according to some embodiments. A BMS can include, for example, a fire suppression system, a security system, a lighting system, a fire detection system, any other system that is capable of managing building functions or devices, or any combination thereof.

The BMS that serves building 10 includes a fire system 100 (e.g., a fire detection and/or fire suppression system), according to some embodiments. Fire system 100 can include fire safety devices (e.g., notification devices such as fire detectors and pull stations, sprinklers, fire alarm control panels, fire extinguishers, water systems etc.) configured to provide fire detection, fire suppression, fire notification to building occupants 150, or other fire suppression-related services for building 10. Fire system 100 includes water system 130, according to some embodiments. Water system 130 provides water from a city line 102 through a building line 104 to building 10 to suppress fires within one or more rooms/spaces of building 10, according to some embodiments. In some embodiments, a main water line 106 is the dominant piping system that distributes water throughout one or more of the building floors in building 10. The water is distributed to the one or more building floors of building 10 via a piping system 108, according to some embodiments.

Referring still to FIGS. 1-4, fire system 100 can also include fire detection devices 118, fire notification devices 114, and fire suppression devices 116 positioned in various rooms/spaces 160 of building 10. Fire suppression devices 116 may include sprinklers, fire extinguishers, etc., or any other device configured to suppress a fire. Fire suppression devices 116 may be positioned in various rooms 160 of building 10. Fire suppression devices 116 may be connected to piping system 108 and serve as one of the corrective actions taken by fire system 100 to suppress fires. In some embodiments, fire suppression devices 116 can engage in suppressive action using dry agents (nitrogen, foam, non-fluorinated foam, air, etc.) instead of water. One or more of the fire suppression devices may be a portable device capable of discharging a fire suppressing agent (e.g., water, foam, gas, etc.) onto a fire. Building 10 may include fire extinguishers (e.g., portable fire suppression devices) on several floors in multiple rooms 160. Fire system 100 can also include one or more pull stations 119 configured to receive a manual input from an occupant 150 of building 10 to indicate the presence of a fire. Pull stations 119 may include a lever, a button, etc., configured to receive a user input indicating that a fire has occurred in building 10. In some embodiments, pull stations 119 are configured to provide a signal to fire alarm control panel 112 regarding a status of the lever, button, etc. When an occupant 150 pulls the lever or pushes the button (or more generally inputs to any of pull stations 119 that there is an emergency situation in building 10), pull stations 119 provide fire alarm control panel 112 with an indication that an occupant 150 of building 10 has actuated one of the pull stations 119. In some embodiments, the indication includes an identification of the particular pull station 119 that has been actuated and a location of the particular pull station 119 (e.g., what floor the fire is at, what room the fire is in, etc.).

Fire notification devices 114 can be any devices capable of relaying audible, visible, or other stimuli to alert building occupants of a fire or other emergency condition. In some embodiments, fire notification devices 114 are powered by Initiating Device Notification Alarm Circuit (IDNAC) power from fire alarm control panel 112. In some embodiments, fire notification devices 114 may be powered by a DC power source (e.g., a battery). In some embodiments, fire notification devices 114 are powered by an external AC power source. Fire notification devices 114 can include a light notification device (e.g., a visual alert device) and a sound notification device (e.g., an aural alert device). The light notification device can be implemented as any component in fire notification devices 114 that alerts occupants 150 of an emergency by emitting visible signals. In some embodiments, fire notification devices 114 include a strobe light configured to emit strobe flashes (e.g., at least 60 flashes per minute) to alert occupants 150 of building 10 of an emergency situation or regarding the presence of a fire 180. A sound notification device can be any component in fire notification devices 114 that alerts occupants of an emergency by providing an aural alert/alarm. In some embodiments, fire notification devices 114 emit signals ranging from approximately 500 Hz (low frequency) to approximately 3 kHz (high frequency).

Fire alarm control panel 112 can be any computer capable of collecting and analyzing data from the fire notification system (e.g., building controllers, conventional panels, addressable panels, etc.). In some embodiments, fire alarm control panel 112 is directly connected to fire notification device 114 through IDNAC power. In some embodiments, fire alarm control panel 112 can be communicably connected to a network for furthering the fire suppression process, including initiating corrective action in response to detection of a fire.

In some embodiments, fire detection devices 118 are configured to detect a presence of fire in an associated room 160. Fire detection devices 118 may include any temperature sensors, light sensors, smoke detectors, etc., or any other sensors/detectors that detect fire. In some embodiments, fire detection devices 118 provide any of the sensed information to fire alarm control panel 112.

Figure 3:
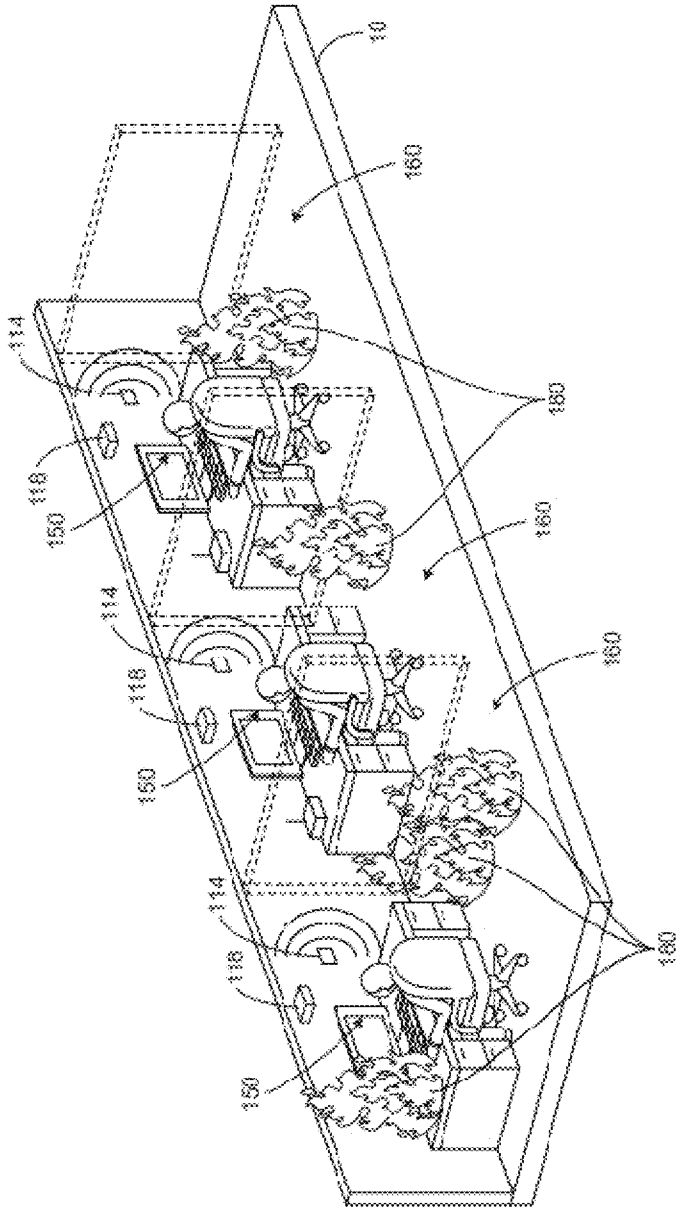
FIG. 3 is a block diagram illustrating a portion (for example, a BMS controller) of BMS of FIG. 2 that serves the building of FIG. 1, according to some embodiments of present disclosure.

Referring particularly to FIG. 3, a block diagram illustrating a portion (for example, a BMS controller) of BMS that serves the building 10 is shown, according to some embodiments of present disclosure. In some embodiments, fire detection devices 118 are configured to monitor any of a temperature, a light intensity, a presence of smoke, etc., of a corresponding room/space 160 of building 10. Fire detection devices 118 can be configured to locally perform a fire detection process to determine if a fire 180 is present in room/space 160 based on the sensed data (e.g., the sensed room temperature, the sensed light intensity in room 160, the sensed smoke in room 160, etc.), according to some embodiments. In some embodiments, fire detection devices 118 provide any of the sensed information (e.g., the room temperature of room 160, the light intensity within room 160, the presence of smoke within room 160, etc.) to fire alarm control panel 112. Fire alarm control panel 112 is configured to receive any of the sensor information from any of fire detection devices 118 throughout building 10 and perform a fire detection process to determine if a fire 180 is present in any rooms/spaces 160 of building 10, according to some embodiments. In some embodiments, fire alarm control panel 112 is configured to cause fire notification devices 114 to provide any of a visual and/or an aural alert to occupants 150 in response to determining that a fire 180 is present in one of rooms 160 of building 10. In some embodiments, fire alarm control panel 112 is configured to cause a specific fire notification device 114 to provide an alarm/alert to an occupant 150 of a particular room/space 160 in response to determining that a fire 180 is present in the particular room/space 160 of building 10.

In some embodiments, fire alarm control panel 112 is configured to provide a BMS controller 366 (see FIG. 4) with a status of any of fire notification devices 114 and/or any of the collected information/data from fire detection devices 118. For example, fire alarm control panel 112 may provide BMS controller 366 with an indication of a current status (e.g., normal mode, alarm mode, etc.) of any of fire notification devices 114. In some embodiments, fire alarm control panel 112 is configured to cause one or more of fire suppression device 116 to suppress the fire in response to determining that a fire is present in building 10. In some embodiments, fire alarm control panel 112 is configured to cause a particular fire suppression device 116 to suppress a fire in a particular room/space 160 in response to determining that a fire 180 is present in the particular room/space 160. In some embodiments, fire alarm control panel 112 is configured to provide BMS controller 366 with a status (e.g., activated, dormant, etc.) of any or all of fire suppression devices 116.

Fire Detection System

Figure 4:
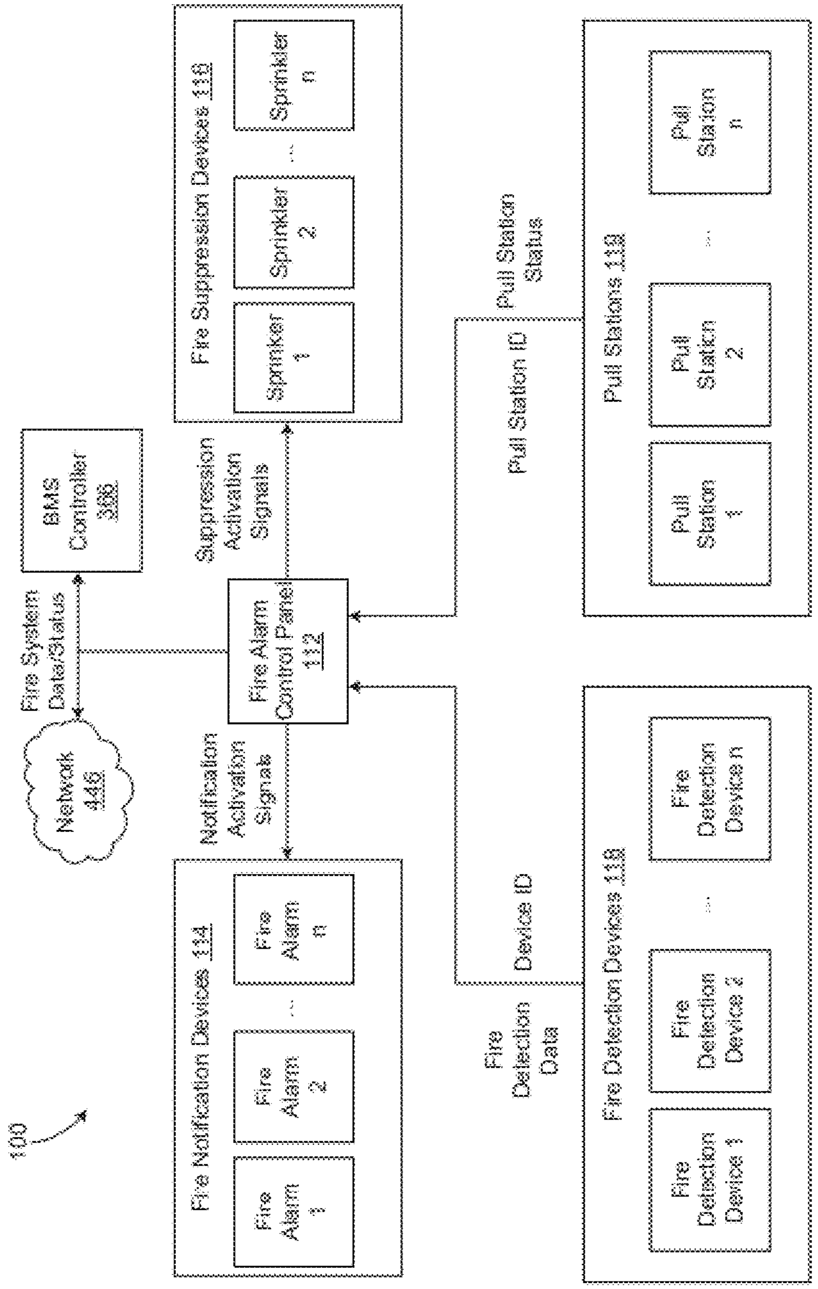
FIG. 4 is a block diagram illustrating a fire system of the BMS of FIG. 2, according to some embodiments of present disclosure.

Referring particularly to FIG. 4, a block diagram illustrating fire system 100 is shown, according to some embodiments of present disclosure. As shown, fire alarm control panel 112 can be configured to receive any fire detection data (e.g., smoke detection, heat/temperature detection, light intensity detection, etc.) from any of fire detection devices 118. In some embodiments, fire alarm control panel 112 also receives a unique device ID (e.g., an identification number, an identification code, etc.) from each of fire detection devices 118. In some embodiments, fire alarm control panel 112 is configured to determine a location in building 10 of each of fire detection device 118 based on the unique device ID received from each of fire detection devices 118. For example, fire alarm control panel 112 can determine that a particular fire detection device 118 is located in a certain room, on a certain floor of building 10.

In some embodiments, fire alarm control panel 112 also receives pull station status information from any of pull stations 119 throughout building 10. In some embodiments, fire alarm control panel 112 is configured to receive a unique pull station ID (e.g., an identification number, an identification name, a unique ID code, etc.) from each of pull stations 119. In some embodiments, fire alarm control panel 112 is configured to perform a fire detection process based on any of the pull station status information received from pull stations 119 and the fire detection data received from fire detection devices 118. Fire alarm control panel 112 can also determine an approximate location of a fire based on the received device IDs of fire detection devices 118 and the received pull station IDs from pull stations 119.

In some embodiments, fire alarm control panel 112 is configured to cause fire notification devices 114 and/or fire suppression devices 116 to activate in response to determining that a fire is present in building 10. In some embodiments, fire alarm control panel 112 uses a database of locations corresponding to each of the unique device IDs of fire detection devices 118 and pull stations 119. In some embodiments, fire alarm control panel 112 is configured to determine an approximate location in building 10 of the fire. In some embodiments, fire alarm control panel 112 is configured to cause particular fire notification devices 114 and particular fire suppression devices 116 to activate in response to determining that a fire is present in a particular room 160 of building 10.

For example, fire alarm control panel 112 may cause all of fire notification devices 114 to activate in response to determining that a fire is present in any room 160 of building 10. In some embodiments, fire alarm control panel 112 is configured to cause only fire suppression devices 116 that are proximate the location of the detected fire to activate. For example, fire alarm control panel 112 may cause all fire notification devices 114 to activate in response to determining a fire is present in one room 160 of building 10 (to cause occupants 150 to evacuate building 10) but may only activate fire suppression devices 116 that are in the particular room where the fire is present.

In some embodiments, fire detection devices 118 are configured to perform a fire detection process locally and are communicably connected with fire notification devices 114. In some embodiments, fire detection devices 118 are configured to provide fire alarm control panel 112 with an indication of whether a fire is present nearby fire detection devices 118. In some embodiments, fire detection devices 118 are configured to cause fire notification devices 114 to activate in response to determining that a fire is present nearby. In some embodiments, fire detection devices 118 are configured to control an operation of fire suppression devices 116. In some embodiments, fire detection devices 118 are configured to cause one or more (e.g., the nearest) of fire suppression devices 116 to activate in response to detecting a fire.

In some embodiments, fire alarm control panel 112 is configured to provide a status of fire system 100 to network 446 and/or BMS controller 366. For example, fire alarm control panel 112 may provide a status of each of fire suppression devices 116 (e.g., activated or dormant), a status of each of fire notification devices 114 (e.g., activated or dormant), a status of each of fire detection devices 118 (e.g., fire detected, no fire detected), and a status of each of pull stations 119 (e.g., activated). In some embodiments, fire alarm control panel 112 also provides network 446 and/or BMS controller 366 with a location of each of fire notification devices 114, fire suppression devices 116, fire detection devices 118, and pull stations 119. In some embodiments, the location includes a floor, room, and relative location within the room of each of fire notification devices 114, each of fire suppression devices 116, each of fire detection devices 118, and each of pull stations 119. For example, fire alarm control panel 112 may provide BMS controller 366 with a status of a particular fire detection device 118, as well as what floor the particular fire detection device 118 is on, as well as a room 160 that the particular fire detection device 118 is in and what wall of the room (e.g., north wall, west wall, etc.) 160 the particular fire detection device 118 is located on. In some embodiments, fire alarm control panel 112 is configured to provide BMS controller 366 with any of the received information from any or all of fire detection devices 118, any or all of pull stations 119, etc. For example, fire alarm control panel 112 may provide BMS controller 366 with any of the smoke detection data, the temperature sensed data, the light intensity data, etc., of each of fire detection devices 118 as well as the corresponding room 160 within which each of fire detection devices 118 are located.

Figure 5:
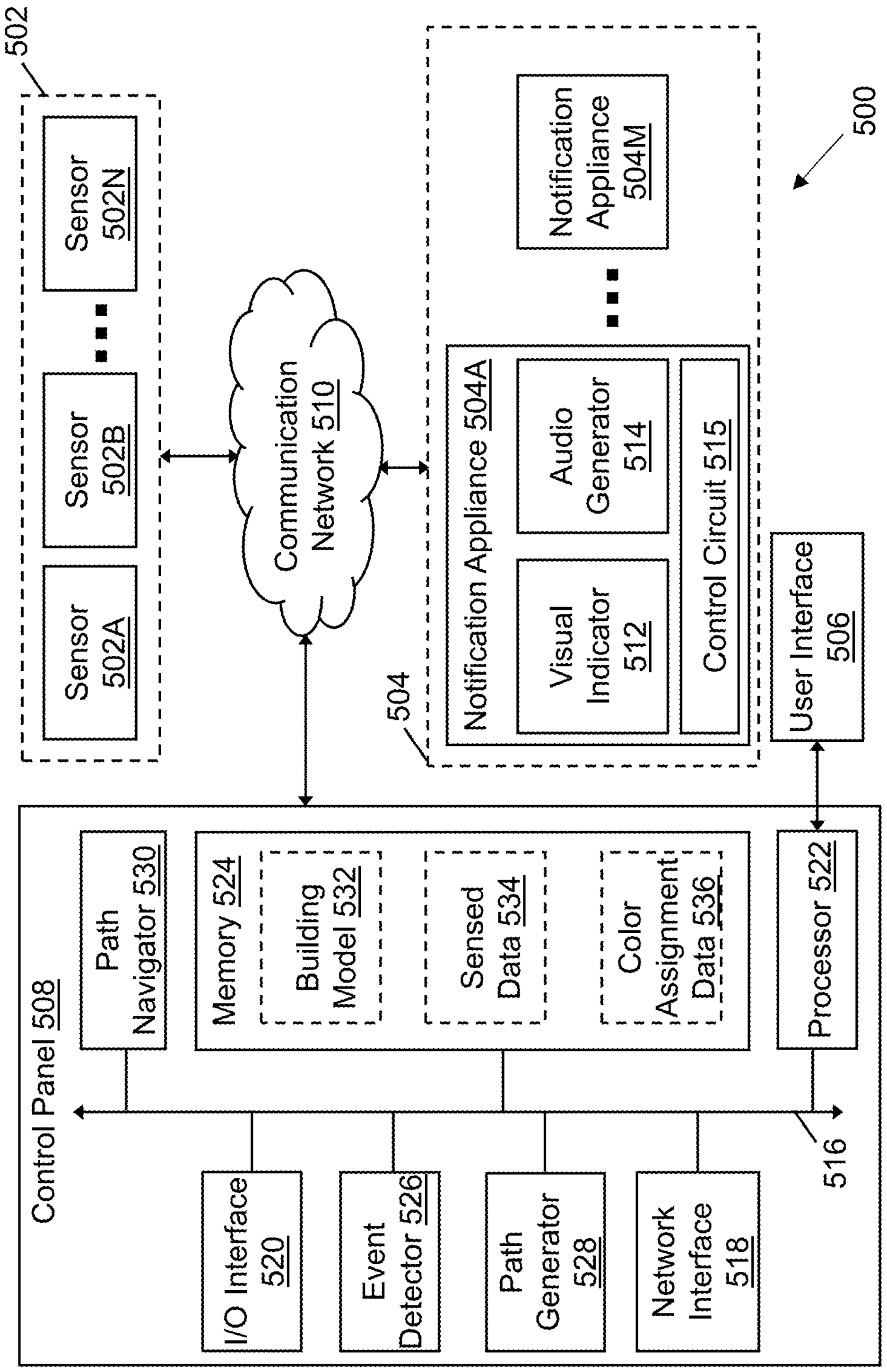
FIG. 5 is a block diagram of a system that provides emergency alerts, according to some embodiments of present disclosure.

Emergency Event Indication and Evacuation Guidance Using Multi-Color LED Notification Appliances Referring now to FIG. 5, a block diagram of a system 500 that provides emergency alerts is shown, according to some embodiments of the present disclosure. System 500 is shown to include a plurality of sensors 502, a plurality of notification appliances 504, a user interface 506, a control panel 508, and a communication network 510. The communication network 510 may be a medium through which data and messages are transmitted between various devices of the system 500. Examples of the communication network 510 may include, but are not limited to, a Wi-Fi network, a light fidelity (Li-Fi) network, a local area network (LAN), a wide area network (WAN), a metropolitan area network (MAN), a satellite network, the Internet, a fiber optic network, a coaxial cable network, an infrared (IR) network, a radio frequency (RF) network, an Ethernet-based communication network, and combinations thereof. The communication network 510 may support various communication protocols (for example, BACnet, Modbus, IP, LON, IDNAC, or the like) to enable communication between various devices of the system 500.

The plurality of sensors 502 may include sensors 502A, . . . , 502N. Each sensor 502A, . . . , 502N be configured to monitor at least one parameter of a space. Examples of the space may include, but are not limited to buildings (e.g., the building 10 as shown in FIGS. 1 and 2), sports auditoriums, stadiums, etc. In some embodiments, the space may be an indoor space. In some other embodiments, the space may be a combination of outdoor and indoor spaces. In some embodiments, the plurality of sensors 502 may include at least one of, but not limited to, smoke sensors, oxygen sensors, heat detectors, temperature sensors, flame detectors, fire sensors, gas sensors, toxic fumes detectors, water detectors, CO detectors, gunshot detection sensor, security cameras, motion sensors, occupancy sensors, proximity sensors, chemical sensors, audio sensors, light sensors, access devices (e.g., RFID locks, biometric locks, door locks, etc.), or the like. In some embodiment, sensors monitoring different parameters may be included in a single housing (not shown) and such housings may be installed at multiple locations in the space so as to cover the entire space for monitoring. In some other embodiments, sensors monitoring different parameters may be included in different housings and these housings may be installed at multiple locations in the space. Installation locations for the plurality of sensors 502 are determined based on sensing ranges of the plurality of sensors 502. For example, spacing between two heat detectors may be set to 7.5 meters whereas spacing between two smoke sensors may be set to 10 meters based on a difference in the sensing ranges of heat detectors and smoke sensors. In other words, sensors measuring a specific parameter may be installed at multiple locations in the space so as to ensure that the entire space is being monitored for that parameter without any blind spots.

The plurality of sensors 502 are shown to be in communication with the control panel 508 via the communication network 510. Thus, each sensor 502A, . . . , 502N may be configured to monitor the at least one parameter of the space, generate sensed data pertaining to the at least one parameter, and further communicate the sensed data to the control panel 508 via the communication network 510. For example, the sensed data may include information pertaining to the at least one parameter such as smoke, oxygen, occupancy, pressure, temperature, humidity, sound, motion etc. In some embodiments, the sensed data may include real-time videos and/or digital images provided by the plurality of sensors 502 such as security cameras. The sensed data may be utilized by the control panel 508 to detect if any emergency event has occurred in the space.

In some embodiments, each sensor 502A, . . . , 502N may have a unique identifier for identification purposes. For example, the sensor 502A may have a different identifier from the sensor 502B. Each sensor 502A, . . . , 502N may be configured to communicate their unique identifier to the control panel 508 along with the sensed data. The unique identifiers of the plurality of sensors 502 may be utilized by the control panel 508 to detect a location of an emergency event that may have occurred in the space.

The plurality of notification appliances 504 may refer to signaling devices installed at different locations in the space to warn and alert occupants regarding an emergency event that has occurred in the space. In some embodiments, the plurality of notification appliances 504 may further provide direction guidance to the occupants to evacuate the location of the detected event or the space. In an example, the fire notification devices 114 described in FIGS. 1-4 may be the plurality of notification appliances 504. Each notification appliance 504A, . . . , 504M may include one or more visual indicators and one or more audio generators. For example, the notification appliance 504A is shown to include a visual indicators 512, an audio generator 514, and control circuit 515. The visual indicator 512 may be used to alert occupants regarding a type of emergency event that has occurred through visual indication. The visual indicator 512 may be further used to provide direction guidance for evacuation paths and safe/unsafe area warning through visual indication. The audio generator 514 may be configured to output an audio message, warning the users regarding the emergency event and/or instructing the users to follow evacuation paths. In some embodiments, the audio generator 514 may emit audio outputs (or messages) in synchronization with the light emitted by the visual indicator 512 for direction guidance. Though the notification appliance 504A is shown to include one visual indicator 512, the scope of the disclosure is not limited to it. In some other embodiments, a notification appliance can include more than one visual indicators without deviating from the scope of the disclosure.

In some embodiments, a visual indicator (for example, the visual indicators 512) is an RGB light emitting diode (LED) diode. In some embodiments, an RGB LED may include a red LED, a green LED, and a blue LED arranged on a panel (for example, a circuit board). Different combination of LEDs with different intensities may be activated to emit light in desired color. The color of emitted light can be used to visually represent a specific emergency event. For example, in a first combination, the RGB diode can be emit cyan light corresponding to an RGB value (0, 100, 100) to indicate earthquake event, and in another combination, the RGB diode can be emit purple light corresponding to an RGB value (160, 32, 240) to indicate gunshot event. Further, one or more characteristics of the emitted light can be modulated to visually provide direction guidance for evacuating the space or an unsafe area. Examples of the one or more characteristics may include an intensity of the emitted light, a flashing pattern, a blinking pattern, brightness of the emitted light, or the like. In some embodiments, a reflector surrounding the RGB LED in a notification appliance may be adjustable in position so as to modify a direction of projection (referred to as "projection direction) of the emitted light. In such a scenario, the one or more characteristics may further include a projection direction of emitted light.

In some other embodiments, a visual indicator (for example, the visual indicators 512) may be an RGB light emitting diode (LED) module. The RGB LED module may include a plurality of red, green, and blue LEDs arranged (for example, in rows and columns, random arrangement, etc.) on a panel (for example, a circuit board). These multi-colored LEDs may be arranged in a staggered order to obtain an even distribution of light. Different combination of LEDs with different intensities may be activated to emit light in desired colors. In some embodiments, different combination of LEDs may be activated to emit light in a desired color while also forming a required pattern. For example, a combination of LEDs can be activated to emit light in pink color while forming a circular pattern. Similarly, another combination of LEDs can be activated to emit light in pink color while forming a square pattern or symbol. The patterns or symbols formed by emitted light can be used to visually represent different emergency events or movement directions. For example, a combination of LEDs can be activated to emit pink light while forming a flame symbol to indicate a fire event and another combination of LEDs can be activated to emit purple light while forming a gun symbol to indicate gunshot event. In another example, a combination of LEDs can be activated to emit green light while forming a left arrow symbol to indicate left direction guidance for evacuation. Another combination of LEDs can be activated to emit green light while forming a right arrow symbol to indicate right direction guidance for evacuation. Similarly, another combination of LEDs can be activated to emit red light while forming a cross symbol or a danger symbol to provide unsafe area warning.

The control circuit 515 may be a circuit coupled to the visual indicator 512 (e.g., the RGB LED(s)) and the audio generator 514. In some embodiments, the control circuit 515 may include an LED driver circuit, a voltage controller, a microcontroller, a power controller, or the like for controlling the visual indicator 512 and the audio generator 514. The control circuit 515 may be configured to receive one or more commands or instructions from the control panel 508 (e.g., a control apparatus) in response to detection of an emergency event in the space. The control circuit 515 may be further configured to control, in response to the one or more commands and/or instructions, the at least one RGB light emitting diode (e.g., the visual indicator 512) to emit light in one of the plurality of colors assigned to detected emergency event. In response to the one or more commands, the control circuit 515 may be further configured to modulate the one or more characteristics of the emitted light to provide direction guidance for an evacuation path from the space. The control circuit 515 may further configured to control the audio generator 514 to emit the one or more audio (or audible) outputs in synchronization with the emitted light for the direction guidance. In other words, the control circuit 515 may be configured to control the visual indicator 512 and the audio generator 514 to provide emergency alerts and direction guidance for evacuation based on the instructions or commands from the control panel 508.

Though the plurality of notification appliances 504 are shown to be separate from the plurality of sensors 502, the scope of the disclosure is not limited to it. In some other embodiments, a notification appliance may be integrated into a sensor housing. In other embodiments, a notification appliance may be mounted on a sensor housing.

Installation locations for the plurality of notification appliances 504 are determined based on visibility constraints in the space. For example, two notification appliances 504 can be installed in a corridor, for example, one at the beginning of the corridor and one at the end of the corridor. In other words, the plurality of notification appliances 504 may be installed at multiple locations in the space to ensure that there are no blind spots in the space where no notification appliance is visible.

The plurality of notification appliances 504 are shown to be in communication with the control panel 508 via the communication network 510. In some embodiments, the plurality of notification appliances 504 may communicate with the control panel 508 based on an addressable communication protocol, for example, IDNAC protocol. Thus, each notification appliance 504A, . . . , 504M can receive instructions from the control panel 508 via the communication network 510 to emit light in specific color having specific characteristics.

The user interface 506 may be associated with an electronic device of a user (e.g., occupant of a building, admin of the system 500, etc.). The electronic device can be a smart phone, a mobile device, desktop, computer, laptop, netbook computing devices, tablet computing devices, digital media devices, personal digital assistant (PDA), wearable devices (e.g., optical head mounted display, smartwatch, etc.), or any other device having communication capabilities and/or processing capabilities. In some embodiments, the user interface 506 may be associated with a user such as a security admin of the space (e.g., a building)

In some embodiments, the control panel 508 may be the fire alarm control panel 112 referred above in FIGS. 1-4. In some other embodiments, the control panel 508 may be a hybrid alarm control panel that can cater to a variety of emergency events. In FIG. 5, the control panel 508 is shown to include a communication bus 516, a network interface 518, an input/output interface 520, a processor 522, a memory 524, an event detector 526, a path generator 528, and a path navigator 530.

The communication bus 516 may correspond to a communication infrastructure using which various internal components (e.g., processing circuitry) of the control panel 508 communicate with each other. The communication bus 516 may be a bridge, a message queue, a multi-core message-passing scheme, and the like. The communication bus 516 may include one or more bus lines for example, a data bus line, an address bus line, and a control bus line.

The network interface 518 may include wired or wireless interfaces (e.g., jacks, antennas, transmitters, receivers, transceivers, wire terminals, etc.) for executing data communications with various systems, devices, or networks of the system 500 using the communication network 510. For example, the network interface 518 may include an Ethernet card and port for sending and receiving data via an Ethernet-based communications network and/or a Wi-Fi transceiver for communicating via a wireless communications network. The network interface 518 may be configured to communicate via local area networks or wide area networks (e.g., the Internet, a building WAN, etc.) and may use a variety of communication protocols (e.g., BACnet, IP, LON, IDNAC, Modbus, etc.). The network interface 518 may be a communication interface configured to facilitate electronic data communication between the control panel 508 and various external systems or devices (e.g., the plurality of sensors 502, the plurality of notification appliances 504, the user interface 506, etc.).

In some embodiments, the network interface 518 may be configured to receive sensed data generated by the plurality of sensors 502. As referred above, the sensed data may include values of the at least one parameter (such as smoke, oxygen, occupancy, pressure, temperature, humidity, sound, motion etc.) monitored by the plurality of sensors 502. The network interface 518 may be further configured to provide the received sensed data to the event detector 526 and/or the memory 524.

The I/O interface 520 may correspond to an interface using which various I/O devices (for example, a display, a keyboard, a touchscreen, a cursor control device, a computer mouse, or the like) are operatively coupled to the control panel 508 to enable a user to interface with the control panel 508. In some embodiments, the I/O interface 520 may be configured to communicatively couple the control panel 508 to one or more peripheral devices through respective pins. An example of such an I/O interface 520 may include a general purpose input/output (GPIO) device.

The processor 522, the memory 524, the event detector 526, the path generator 528, and the path navigator 530 may be collectively referred to as the processing circuitry of the control panel 508. In some embodiments, the processing circuitry can be a processing circuit of the building management systems (BMS) described above.

The processor 522 may be a general purpose or specific purpose processor, an application specific integrated circuit (ASIC), one or more field programmable gate arrays (FPGAs), a group of processing components, or other suitable processing components. The processor 522 may be configured to execute computer code or instructions stored in the memory 524 or received from other computer readable media (e.g., CDROM, network storage, a remote server, etc.).

The memory 524 may include suitable logic, circuitry, interfaces, and/or devices (e.g., memory units, memory devices, storage devices, etc.) for storing data and/or computer code for completing and/or facilitating the various processes described in the present disclosure. The memory 524 may include random access memory (RAM), read-only memory (ROM), hard drive storage, temporary storage, non-volatile memory, flash memory, optical memory, or any other suitable memory for storing software objects and/or computer instructions. The memory 524 may include database components, object code components, script components, or any other type of information structure for supporting various activities and information structures described in the present disclosure. The memory 524 may be communicatively coupled to the processor 522 via the communication bus 516 and may include computer code for executing (e.g., by the processor 522) one or more processes described herein.

In some embodiments, the memory 524 may be configured to store various types of information such as a building model 532. The building model 532 may be obtained based on Building Information Modeling (BIM). The building model 532 may include digital representations of physical and functional characteristics of a building (for example, building 10 as shown in FIGS. 1 and 2). The building model 532 may represent a building and its equipment via electronic maps such as 2-Dimensional (2D) maps, 3-Dimensional (3D) maps etc. The building model 532 may provide information on various aspects of the building such as a floorplan, locations of various objects in the building, depth information for the objects, building layouts, devices information, or the like. Examples of the objects in the building may include building points, building equipment, lights, furniture, doors, windows, stairs, elevators, emergency exits, the plurality of sensors 502, the plurality of notification appliances 504, or the like.

In some embodiments, the memory 524 may further store a knowledge base (not shown) that may include historical data such as previous commands generated by the control panel 508, device information, etc. In some embodiments, the memory 524 may further store data pertaining to the plurality of sensors 502, the plurality of notification appliances 504, for example, unique identifiers, location of installation within the building, predetermined threshold values, etc. The data pertaining to the plurality of sensors 502 may further include data sensed by each of the plurality of sensors 502. Hereinafter, the data sensed by each of the plurality of sensors 502 is referred to and designated as "sensed data 534".

In some embodiments, the memory 524 may further store color assignment data 536. Color assignment data 536 may include a mapping between a plurality of colors and a plurality of events. Examples of the plurality of events may include, but are not limited to, fire, flood, earthquake, oxygen deficiency, terrorist attack, gunshot, gas leakage, damaging of one or more building equipment, breaking and entering, and the like. When a specific event occurs in the space, the control panel 508 may programmatically control the plurality of notification appliances 504 to emit light in a color assigned to the specific event in the color assignment data 536. For example, in the color assignment data 536, purple color indicated by RGB value (160, 32, 240) may be assigned to gunshot event. Thus, when the control panel 508 detects a gunshot event to have occurred in the space based on the sensed data 534, the control panel 508 may provide instructions or signals to the plurality of notification appliances 504 to emit light with RGB value (160, 32, 240). Using the color assignment data 536, the control panel 508 may be configured to control the plurality of notification appliances 504 to programmatically emit light in different colors and characteristic patterns to indicate different events and direction guidance for evacuation. In some embodiments, color assignment may be a programmable feature, for example, an admin of the system 500 may configure the color assignment data 536 to map different events to the colors of their choice. In another embodiments, color assignment may be default factory setting and may not be changeable by a user.

In some embodiments, the color assignment data 536 may further include a mapping between safe/unsafe areas and a plurality of colors. For example, red color with RGB value (255, 0, 0) may be reserved for indicating an unsafe area and green color with RGB value (0, 255, 0) may be reserved for indicating a safe area. Further, the colors reserved for indicating safe/unsafe areas may not be assigned to any event to avoid confusion.

It will be apparent to a person of ordinary skill in the art that above examples of color assignment do not limit the scope of the disclosure. The color assignment may vary depending on requirement and/or regulatory guidelines.

The event detector 526 may include suitable logic, circuitry, and/or interfaces that are configured to execute one or more processes for emergency event detection. The event detector 526 may be configured to receive the sensed data 534. In some embodiments, the event detector 526 may receive the sensed data 534 from the network interface 518. In some other embodiments, the event detector 526 may retrieve the sensed data 534 from the memory 524. Further, the event detector 526 may be configured to analyze the sensed data 534 to detect whether at least one of the plurality of events has occurred within the space. The event detector 526 may compare the sensed data 534 with one or more threshold values stored in the memory 524. For example, the event detector 526 may detect occurrence of an event (for example, fire), when sensed data 534 provided by smoke detectors exceeds a threshold value set for permissible smoke level. In another example, the event detector 526 may detect oxygen deficiency within the space, when sensed data 534 (such as measured oxygen level) provided by the oxygen detector falls below a threshold value set for the required oxygen level.

In some embodiments, the event detector 526 may analyze the sensed data 534 received from multiple sensors 502. For example, the event detector 526 may evaluate sensed data 534 from fire sensors, smoke detectors, heat sensors, thermal imagers, and other sensors to determine that it is likely that a fire event has occurred in the space. In another example, the event detector 526 may detect that a gunshot event has occurred when sensed data 534 generated by a gunshot sensor exceeds a threshold level. However, the event detector 526 may regard the detection to be false positive when digital images and videos of the same location as the gunshot sensor and for the same timestamp indicate that the gunshot sound originated from a mobile phone of a user who was listening to music. Thus, by analyzing sensed data 534 from multiple sensors 502, a probability of detecting a false event may be reduced significantly.

In some embodiments, the event detector 526 may be further configured to determine a location of the detected event. As described above, the unique identifiers of the plurality of sensors 502 may be transmitted along with the sensed data 534 to the control panel 508. Thus, the unique identifiers of the plurality of sensors 502 may be received by the event detector 526 along with the sensed data 534. Further, the event detector 526 may determine a location of installation of one or more sensors 502A, . . . , 502N that generated the sensed data 534 related to detected event based on the unique identifier of the one or more sensors 502A, . . . , 502N and the pre-stored building model 532 in the memory 524. The event detector 526 may then determine the location of occurrence of the detected event within the space based on the location of installation of the one or more sensors. In some embodiments, where sensors at multiple locations sense data related to an emergency event, the event detector 526 may infer the location of the sensor which sensed the data with highest intensity or value to be the location of the emergency event. In an exemplary scenario, a gunshot event may be sensed by three gunshot sensors. In such a scenario, the event detector 526 may infer that the gunshot occurred proximal to a location of installation of that gunshot sensor which sensed the data with highest intensity or value. Additionally or alternatively, the event detector 526 may infer that the gunshot occurred proximal to a location of installation of the gunshot sensor that was the first one to sense the data. The event detector 526 may verify the inference using digital images captured by security cameras proximal to the gunshot sensor.

In some embodiments, subsequent to the detection of the event, the event detector 526 may continue to dynamically monitor subsequent sensed data 534 generated by the plurality of sensors 502. Based on the dynamic monitoring of the subsequent sensed data 534, the event detector 526 may detect whether the event has spread or shifted to one or more other locations in the space. For example, initially sensed data 534 from fire and smoke sensors on $5^{th}$ floor of a building may have exceeded the threshold value. As a result, the event detector 526 may have determined $5^{th}$ floor to be the location of the event. However, after 20 minutes, sensed data from fire and smoke sensors on $4^{th}$ and $6^{th}$ floors of the building, which earlier was below the threshold value, also exceeds the threshold value. In such a scenario, the event detector 526 may detect that the fire has now spread to $4^{th}$ and $6^{th}$ floors. In another example, the event detector 526 may have detected a gunshot event on $3^{rd}$ floor of a building. After 15 minutes, digital images and video captured by cameras installed in the corridor of the $3^{rd}$ floor may have recorded a person carrying a weapon (e.g., gun) running towards the staircase of the $3^{rd}$ floor and subsequently cameras installed in the staircase area may capture digital images and video in which the same person is recorded running downstairs. In such a scenario, the event detector 526 may detect that the gunshot event suspect is on the move and the emergency event has now shifted from the $3^{rd}$ floor to the staircase area. Thus, by monitoring the sensed data 534 generated by multiple sensors 502 subsequent to the detected event, the event detector 526 may be able to track and detect whether the event is contained to the initial location of detection or has spread or shifted to other locations. Such monitoring enables the event detector 526 to keep a track of the dynamic changes in the event.

In some embodiments, the event detector 526 may utilize one or more machine learning models stored in the memory 524 to analyze the sensed data 534 for detection of the plurality of events. The event detector 526 may be configured to apply one or more prediction models to the dynamically monitored sensed data 534 to predict the spread or shift of the detected event to one or more other locations in the space. For example, the event detector 526 may apply the prediction models to the sensed data 534 generated by fire and smoke sensors, the pre-stored building model 532, and other environmental factors (e.g., wind speed, fire suppressant impact, or the like), and may predict how fast the fire will spread to other floors or sections of the space. In another example, the event detector 526 may apply the prediction models to the sensed data 534 (videos/images) generated by cameras and the pre-stored building model 532 to predict a future movement trajectory of a gunshot suspect who is on the move. In some embodiments, the event detector 526 may be configured to run one or more object recognition and facial recognition models to identify and track suspects involved in a gunshot event. In some embodiments, the event detector 526 may generate one or more notifications to be rendered on the user interface 506 in response to detection of any of the plurality of events. For example, the event detector 526 may provide various notifications for emergency event alerts and directions to evacuation path to be rendered on the user interface 506.

In some embodiments, the event detector 526 may be configured to operate the plurality of notification appliances 504 to emit light in a specific color assigned to the detected event. The event detector 526 may access the color assignment data 536 stored in the memory 524 and determine which color is assigned to the detected event. For example, when the detected event is a gunshot event and the color assigned to gunshot event is purple, the event detector 526 may operate the plurality of notification appliances 504 to emit light in purple color as a warning to the occupants of a gunshot event in the building.

In some other embodiments, the event detector 526 may operate each of the plurality of notification appliances 504 to emit light in purple color that forms a symbol or pattern (e.g., a gun) indicating the gunshot event. The display of a symbol or a pattern related to the detected event makes it easier for occupants to comprehend which event has occurred.

In some embodiments, the event detector 526 may be further configured to determine a severity level of the detected event to evaluate whether mass evacuation is required from the space, or it would be sufficient to move occupants away from location of the detected event without needing them to exit the space. For example, in event of fire, mass evacuation may be required. However, in an event of water leakage, mass evacuation might not be required.

The path generator 528 may be configured to communicate with the network interface 518 and the event detector 526 to obtain the sensed data 534 and information on the detected event. The path generator 528 may be further configured to determine and generate one or more safest and shortest evacuation paths for occupants subsequent to detection of the event. The path generator 528 may further determine viable emergency exits and paths to the viable emergency exits using the pre-stored building model 532. Viable emergency exits may refer to those emergency exits that are not proximal (e.g., nearby) to the location of the detected event. The path generator 528 may identify the viable emergency exits based on an analysis the location of the event and locations of various emergency exits of the indoor space. The path generator 528 may then determine and generate evacuation paths to the viable emergency exits such that the evacuation paths bypass or avoid the location of the detected event. In some embodiments, the path generator 528 may generate a set of evacuation paths which are spaced apart from the location of the detected event by at least a set distance value. However, if no such path which is spaced apart from the location of the detected event by at least a set distance value exists, the path generator 528 may relax the set distance value to still ensure that the evacuation path bypasses or avoids the detected location of the event.

In some embodiments, the path generator 528 may determine that the hazardous event has compromised all emergency exits. In such a scenario, the path generator 528 may determine alternate exit options from the building or may determine safe shelters within the building. The path generator 528 may then determine and generate evacuation paths to the alternate emergency exits or safe shelters while bypassing or avoiding the location of the detected event. In some embodiments, the path generator 528 may utilize one or more artificial intelligence and/or machine learning based models stored in the memory 524 to determine the evacuation paths for occupants.

In some embodiments, the path generator 528 may generate the evacuation paths based on the severity level of the detected event. For example, when the severity of the detected event is low, the path generator 528 may determine an unsafe area surrounding the detected event to which public access is to be restricted and generate evacuation paths to navigate occupants from the unsafe area towards a safe area within the space. However, when the severity of the detected event is high, the path generator 528 may generate the evacuation paths to evacuate the occupants from the space while avoiding (or bypassing) the location of the detected event.

In some embodiments, the path generator 528 may be configured to update some of the previously generated evacuation paths or generate new evacuation paths when the event detector 526 detects the event to have spread or shifted to other locations which are proximal to or are included in some of the previously generated evacuation paths. The new (or updated) evacuation paths are generated to avoid or bypass the other locations to which the detected event has now spread or shifted. In some embodiments, the new (or updated) evacuation paths further bypass the location at which the event was initially detected. However, in some other embodiments, the new (or updated) evacuation paths may include the location at which the event was initially detected when the detected event has completely shifted to the other locations and is no longer detectable at the previous location. In an exemplary scenario of a gunshot event, the gunshot suspect may be on the move and the initial location at which the gun shot was detected may now be safe. In such a scenario, the path generator 528 may generate a new evacuation path that avoids the locations in the movement trajectory of the gunshot suspect but may include the initial location of the gunshot event which is now safe.

In some embodiments, the path generator 528 may be configured to update or generate evacuation paths based on the other locations to which the event is predicted to spread or shift. As a result, the path generator 528 is capable of making pre-emptive decisions while generating evacuation paths and avoids those locations as well to which the event is most likely to spread or shift. Such generation of evacuation paths provides an additional layer of safety while evacuating occupants from the space.

In some embodiments, the path generator 528 may be configured to determine personalized evacuation paths for one or more occupants based on a current location of the occupants and the location of the detected event. The current location of the occupants may be detected based on the sensed data 534. For example, sensed data generated by one or more occupancy sensors may indicate a current location of occupants in the space. Further, live images and videos generated by one or more cameras may indicate current locations of occupants in the space. In some other embodiments, the current location of an occupant can be received by the control panel 508 from a mobile device of the occupant.

The path navigator 530 may be configured to communicate with the network interface 518, the event detector 526, and the path generator 528. The path navigator 530 may display the one or more evacuation paths generated by the path generator 528 to allow occupants to navigate along the one or more evacuation paths. The path navigator 530 may further display the unsafe area generated by the path generator 528 to prevent occupants from entering the unsafe area (or zone). The path navigator 530 may be configured to provide instructions to the plurality of notification appliances 504 to control (e.g., modulate) one or more characteristics of the emitted light based on the generated evacuation path to provide direction guidance for the evacuation paths and/or for providing unsafe area warning to the occupants.

In some embodiments, the path navigator 530 may be configured to control an intensity level of the emitted light to indicate nearness to the location of the detected event. Thus, a notification appliance 504 that is near to the location of the detected event may emit light at higher intensity as compared to another notification appliance 504 that is further away from the location of the detected event. An occupant may follow the decreasing intensity gradient of the emitted light to follow the evacuation path. To control the intensity level of the emitted light by a notification appliance 504, the path navigator 530 may be configured to transmit an instruction indicating the intensity level in which the specific color light is to be emitted by the notification appliance 504. In an exemplary scenario, the path navigator 530 may transmit a first instruction to those notification appliances 504 that are within 1 meter from the location of the detected event to emit light having first intensity level. The path navigator 530 may further transmit a second instruction to those notification appliances 504 that are within 1-5 meters from the location of the detected event to emit light having second intensity level, and a third instruction to those notification appliances 504 that are within 5-10 meters from the location of the detected event to emit light having third intensity level. Here, the first intensity level may be highest, and the third intensity level may be the lowest. Thus, the intensity level of the emitted light by the notification appliances 504 indicates an occupant whether the occupant is moving away from the detected event or towards the detected event.

In some other embodiments, the path navigator 530 may be configured to control a blinking or a flashing rate of the emitted light to indicate nearness to the location of the detected event. Thus, a notification appliance 504 that is near to the location of the detected event may emit light having higher blinking or flashing rate as compared to another notification appliance 504 that is further away from the location of the detected event. An occupant may follow the decreasing blinking or flashing rate to follow the evacuation path. To control the blinking or flashing rate of the emitted light by a notification appliance 504, the path navigator 530 may be configured to transmit an instruction indicating the blinking or flashing rate (for example, 1 second, 2 seconds, 3 seconds, etc. interval in consecutive flashes) at which the specific color light is to be emitted by each notification appliance 504. In an exemplary scenario, the path navigator 530 may transmit a first instruction to those notification appliances 504 that are within 1 meter from the location of the detected event to emit light having first flashing rate (e.g., 0.5 second interval in consecutive flashes). The path navigator 530 may further transmit a second instruction to those notification appliances 504 that are within 1-5 meters from the location of the detected event to emit light having second flashing rate (e.g., 1.5 seconds interval in consecutive flashes), and a third instruction to those notification appliances 504 that are within 5-10 meters from the location of the detected event to emit light having third flashing rate (e.g., 2.5 seconds interval in consecutive flashes). Here, the first flashing rate may be the highest and the third flashing rate may be the lowest. Higher flashing rate indicates lower interval in consecutive flashes. Thus, the flashing rate at which the notification appliances 504 emit light indicates an occupant whether the occupant is moving away from the detected event or towards the detected event. In some embodiments, the blinking or flashing pattern of the notification appliances 504 may be controlled to provide direction guidance for the evacuation paths.

In some other embodiments, the path navigator 530 may be configured to control a combination of the intensity level and the flashing rate/pattern to provide direction guidance for the evacuation paths. In some other embodiments, the path navigator 530 may be configured to transmit instructions to adjust a position of the reflector in each notification appliance 504 so as to direct (or project) the emitted in a direction of the evacuation path.

In some embodiments, the path navigator 530 may be configured to operate the plurality of notification appliances 504 to emit light with new characteristics based on update or change in evacuation paths generated by the path generator 528. In an example, due to spread or shift of the detected event, some notification appliances 504 that were earlier present away from the location of the detected event may have come under the unsafe area or nearer to the new location of the detected event. In such a scenario, the path navigator 530 may operate these notification appliances 504 to emit light with increased intensity level and/or increasing flashing rate. Thus, when the increased intensity and/or increased flashing rate is observed by an occupant, the occupant understands that the event has now spread to the new location and may try to move away from that location. In other words, the direction guidance provided by the plurality of notification appliances 504 is updated in response to dynamically changing evacuation paths. Such dynamic control of the plurality of notification appliances 504 in response to the dynamically changing parameters of the space enables the system 500 to provide safest evacuation paths to the occupants.

In some embodiments, the path navigator 530 may be further configured to operate the plurality of notification appliances 504 to generate audible (or audio) outputs in synchronization with the emitted light to aid visually impaired occupants to evacuate the space. For example, the audible outputs may be selected from pre-recorded direction guidance messages to synchronize with the direction guidance indicated by the emitted light. The audible outputs further improve the direction guidance provided by the modulating characteristics of the emitted light.

Though the processor 522, the event detector 526, the path generator 528, and the path navigator 530 are shown to be separate entities, the scope of the disclosure is not limited to it. In some other embodiments, the functionalities of the event detector 526, the path generator 528, and the path navigator 530 may be integrated into the processor 522. In some other embodiments, the memory 524 may be configured to store suitable logic, code, programs, or instructions which when executed by the processor 522 may enable to processor 522 to implement the functionalities of the event detector 526, the path generator 528, and the path navigator 530.

Figure 6A:
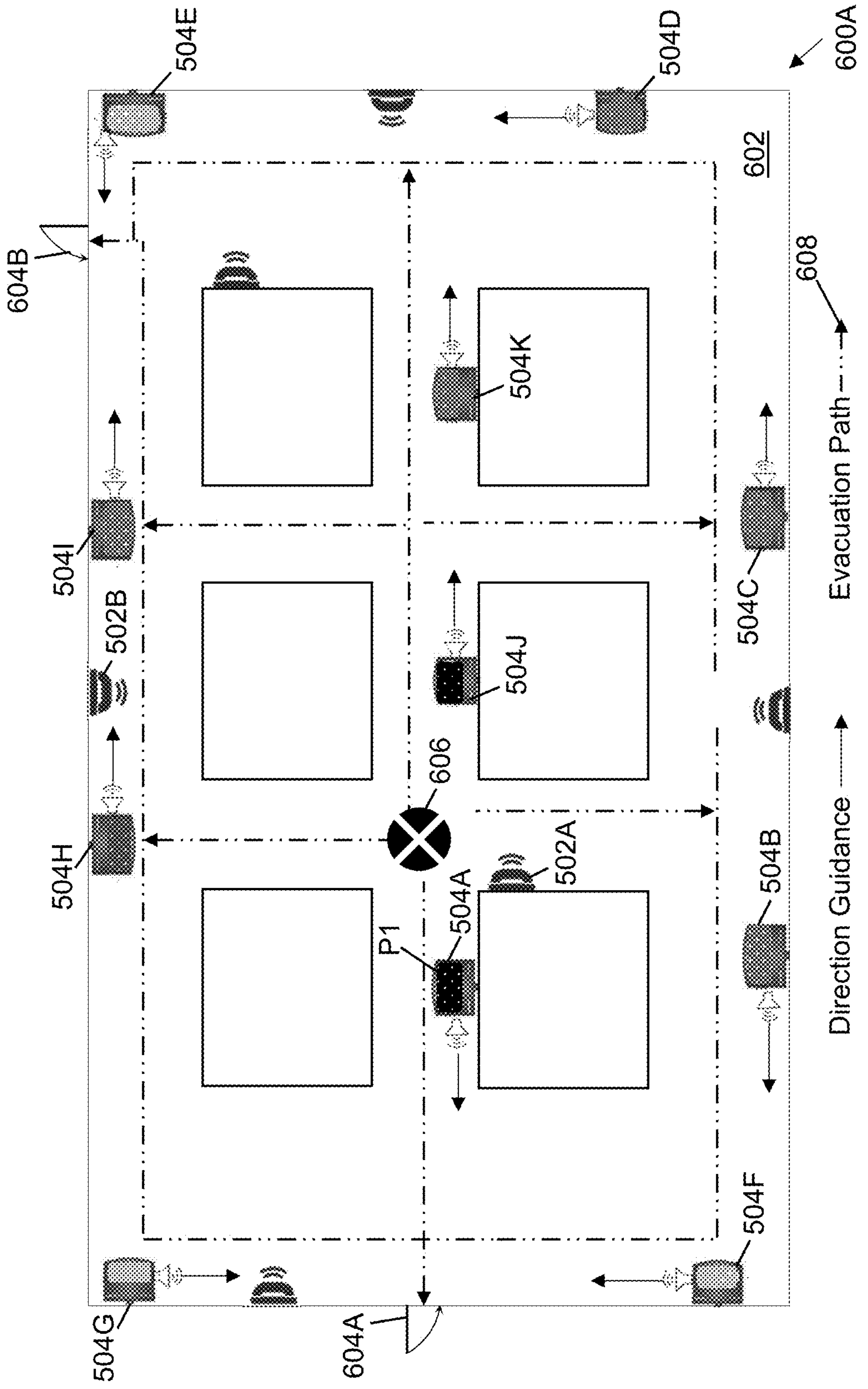
FIGS. 6A and 6B are diagrams that illustrate exemplary scenarios in which emergency alerts are provided using multi-color LED notification appliances, according to some embodiments of present disclosure.
Figure 6B:
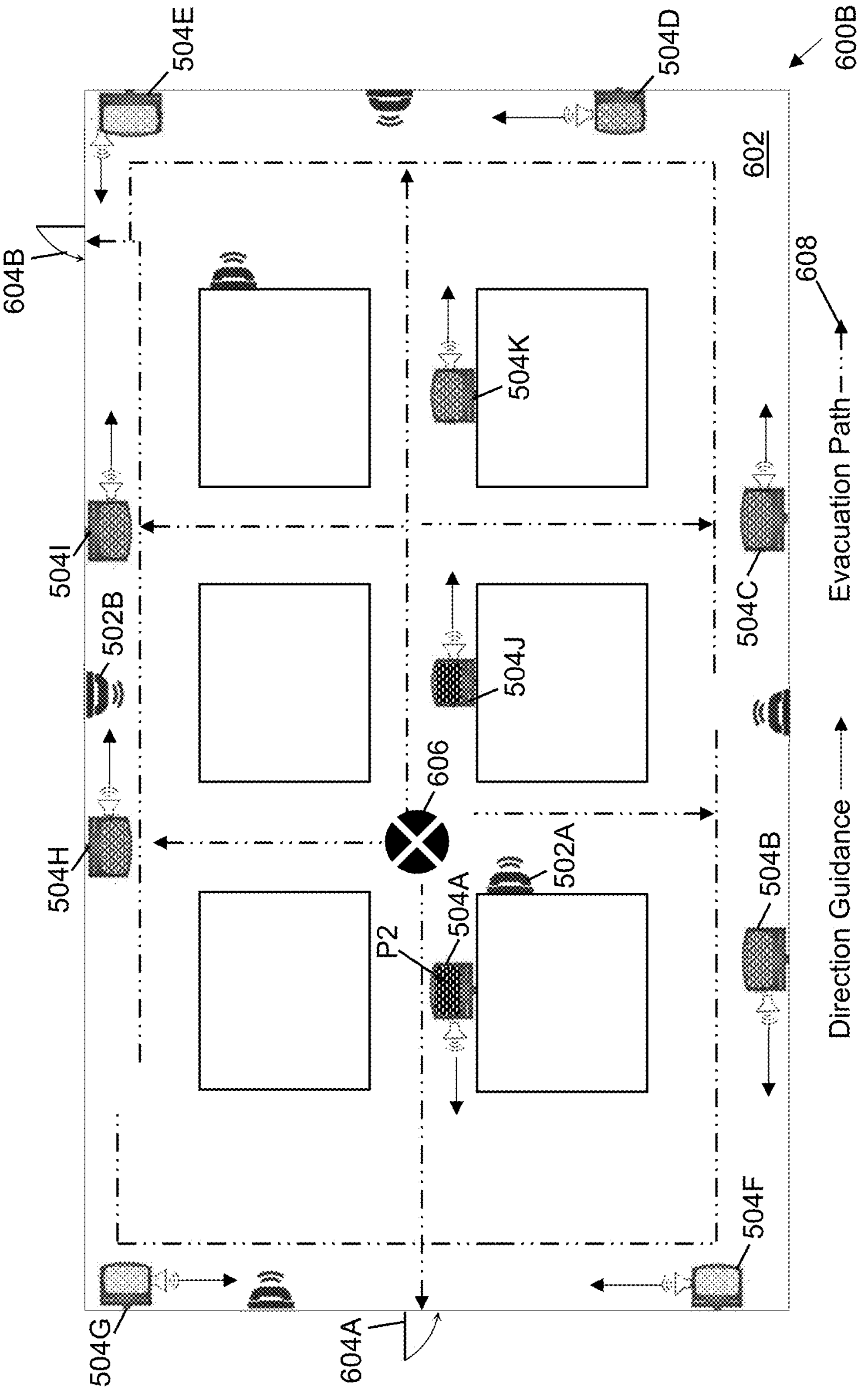

Referring now to FIGS. 6A and 6B, diagrams that illustrate exemplary scenarios 600A and 600B in which emergency alerts are provided using multi-color LED notification appliances are shown, according to some embodiments of the present disclosure.

With reference to FIG. 6A, the exemplary scenario 600A illustrates a space 602 having two exits 604A and 604B. The plurality of sensors 502 (for example, sensors 502A, 502B, etc.) are installed at a plurality of locations in the space 602. For the sake of brevity, only two sensors 502A and 502B are numbered. Further, the space 602 has the plurality of notification appliances 504 installed at a plurality of locations therein. The plurality of sensors 502 transmit sensed data 534 to the control panel 508 (shown in FIG. 5). The control panel 508 analyzes the received sensed data 534 to detect whether any of the plurality of events has occurred within the space 602, and further determines a location of the detected event. In an example, based on the sensed data 534 received from the sensor 502A (e.g., a gunshot sensor), the control panel 508 (e.g., the event detector 526) may detect that a gunshot event has occurred at a location 606. Upon detection of gunshot event, the control panel 508 (e.g., the path generator 528) may determine one or more evacuation paths (indicated by arrow types 608) towards the exits 604A and 604B to evacuate occupants from the space 602. Further, based on the color assignment data 536 stored in the memory 524 of the control panel 508, the control panel 508 may further determine which color among the plurality of colors is assigned to gunshot event.

The control panel 508 may be further configured to operate the plurality of notification appliances 504 to emit light in the color (e.g., first color) assigned to the gunshot event. For example, as shown in FIG. 6A, the plurality of notification appliances 504 emit the first color assigned to the gunshot event. For the sake of illustration, the first color (e.g., pink) of light emitted by the notification appliances 504A-504K is represented by a first pattern fill P1. The control panel 508 may further provide instructions to the plurality of notification appliances 504 (e.g., corresponding control circuit 515) to control one or more characteristics of the emitted light. For example, as shown in FIG. 6A, intensity level of the light emitted by the plurality of notification appliances 504 varies according to the evacuation path. As the notification appliances 504A and 504J are nearest to the location 606 of the gunshot event, the notification appliance 504A and 504J emit light in the first color with highest intensity level. The high intensity level alerts occupants to avoid approaching near the location 606 due to a gunshot event. Similarly, as the notification appliances 504E, 504F, and 504G are nearest to the exits 604A and 604B, the notification appliances 504E, 504F, and 504G emit light in the first color with lowest intensity level. The lowest intensity level alerts the occupants of a nearby safe exit. Further, the intensity level of the light emitted by the other notification appliances 504E, 504F, and 504G decreases as a function of distance from the emergency exits 604A and 604B. For the sake of illustration, the varying intensity level of the light emitted by the notification appliances 504A-504K is represented as gradient of black color. The varying intensity level of the light provides direction guidance to occupants in order to safely evacuate the building by following the evacuation paths. In other words, the color of the light emitted by the plurality of notification appliances 504 alerts the occupants of the type of event and the characteristics (for example, varying intensity level) of the emitted light provides direction guidance to the occupants for following evacuation paths. In some embodiments, the control panel 508 may further provide instructions to the plurality of notification appliances 504 to generate audible outputs that provide direction guidance for the evacuation path.

With reference to FIG. 6B, the exemplary scenario 600B illustrates the space 602 having two exits 604A and 604B. The plurality of sensors 502 and the plurality of notification appliances 504 are installed at a plurality of locations in the space 602. In exemplary scenario 600B, the control panel 508 may detect that some other emergency event (instead of gunshot) has occurred at the location 606, and hence the plurality of notification appliances 504 are operated by the control panel 508 to emit a different color (e.g., a second color) assigned to the other event. For the sake of illustration, the second color of light emitted by the notification appliances 504A-504K is represented by a second pattern fill P2 (different from the first pattern fill P1 shown in FIG. 6A).

Thus, the exemplary scenarios 600A and 600B illustrates that the control panel 508 may operate the plurality of notification appliances 504 to emit different colors for different emergency events as per the color assignment data 536 (shown in FIG. 5).

Though FIGS. 6A and 6B illustrate the use of varying intensity level of the emitted light to provide direction guidance to the occupants, the scope of the disclosure is not limited to it. In some other embodiments, flashing rate or blinking rate, flashing pattern or blinking pattern, projection direction, and/or brightness level of emitted light by the plurality of notification appliances 504 may be controlled to provide direction guidance for the evacuation paths. In some other embodiments, flashing rate or blinking rate of the plurality of notification appliances 504 may be controlled in addition to the intensity level for providing direction guidance for the evacuation paths. Additionally or alternatively, in some other embodiments, projection direction of the light emitted by the plurality of notification appliances 504 may be controlled for providing direction guidance for the evacuation paths.

Figure 7A:
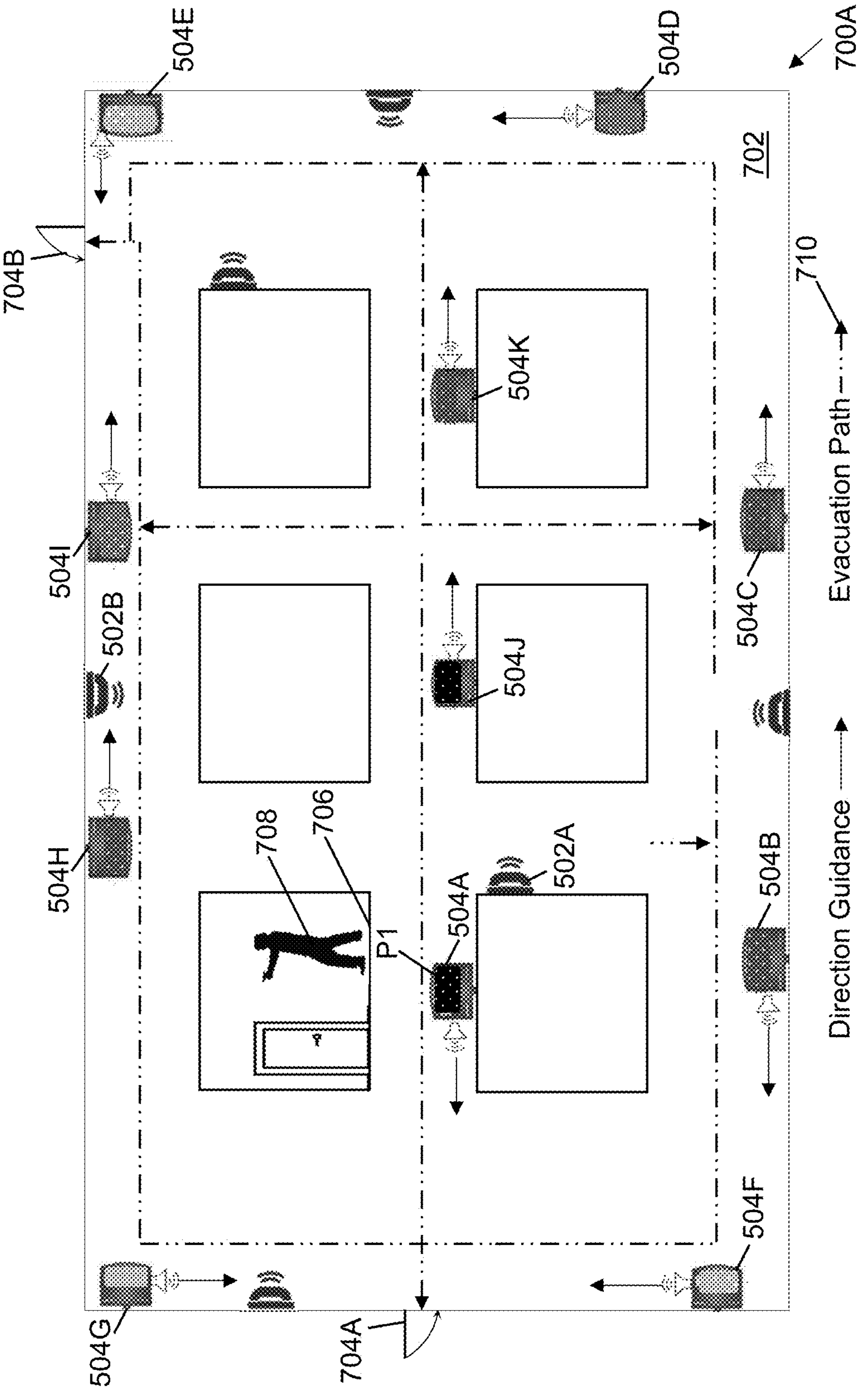
FIGS. 7A and 7B are diagrams that illustrate exemplary scenarios in which emergency alerts and dynamic evacuation guidance are provided using multi-color LED notification appliances, according to some embodiments of present disclosure.
Figure 7B:
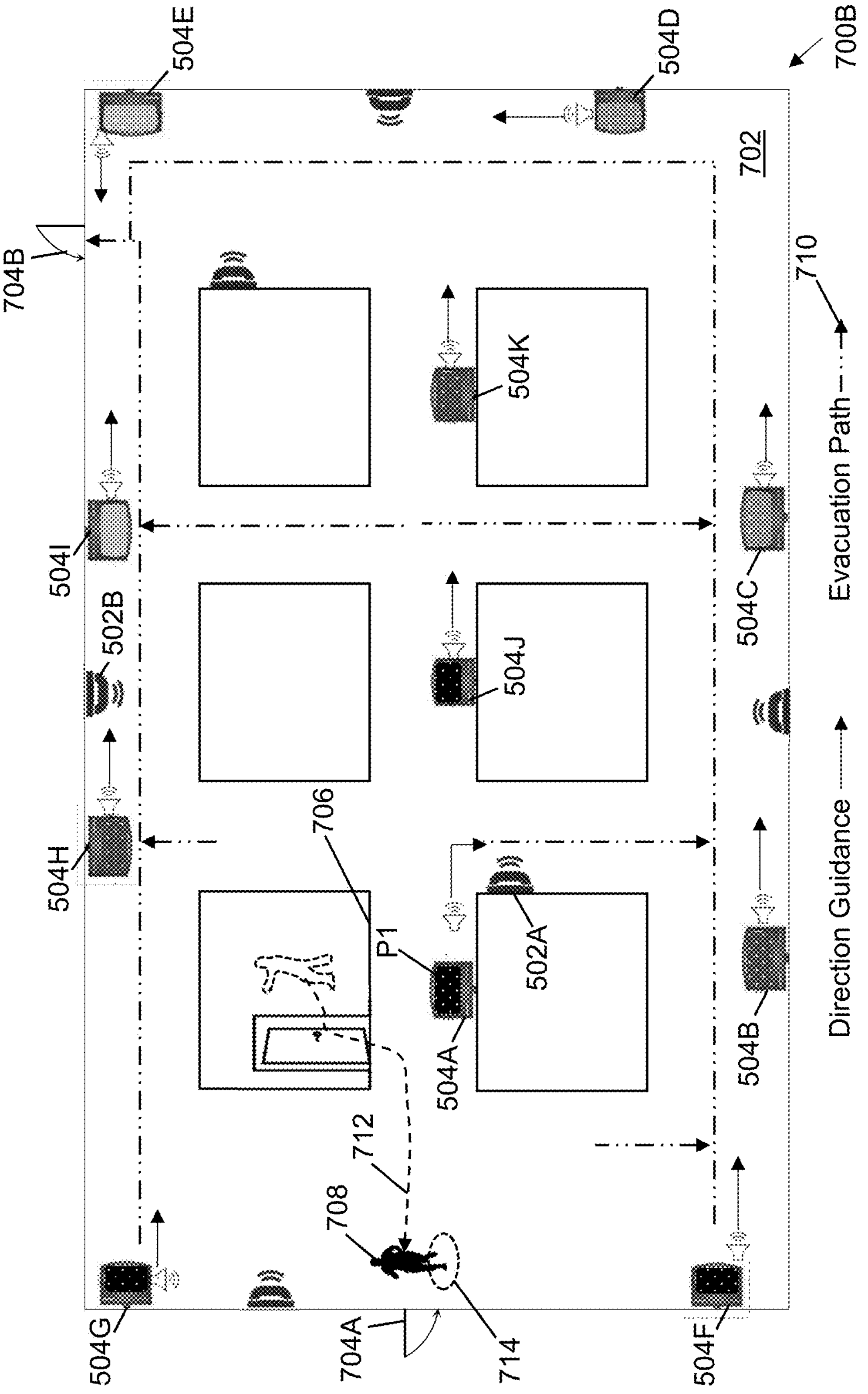

Referring now to FIGS. 7A and 7B, diagrams that illustrate exemplary scenarios 700A and 700B in which emergency alerts and dynamic evacuation guidance are provided using multi-color LED notification appliances are shown, according to some embodiments of the present disclosure.

With reference to FIG. 7A, the exemplary scenario 700A illustrates a space 702 that has two exits 704A and 704B. The plurality of sensors 502 (for example, sensors 502A, 502B, etc.) and the plurality of notification appliances 504 (e.g., notification appliances 504A-504K) are installed at a plurality of locations in the space 702. For the sake of brevity, only two sensors 502A and 502B are numbered. The plurality of sensors 502 transmit sensed data 534 to the control panel 508 (shown in FIG. 5). The control panel 508 analyzes the received sensed data 534 to detect whether any of the plurality of events has occurred within the space 702, and further determines a location of the detected event. In an example, based on the sensed data 534 received from the sensor 502A (e.g., a gunshot sensor, cameras, etc.), the control panel 508 (e.g., the event detector 526) may detect that a gunshot event has occurred at a location 706. Further, the control panel 508 may apply one or more object detection and facial recognition algorithms on the sensed data 534 (e.g., images and videos) to identify and build a profile of one or more gunshot suspects (e.g., a suspect 708).

The control panel 508 (e.g., the path generator 528) may then determine one or more evacuation paths (indicated by arrow types 710) towards the exits 704A and 704B (e.g., viable emergency exits) to evacuate occupants from the space 702. Further, based on the color assignment data 536 stored in the memory 524, the control panel 508 may further determine which color among the plurality of colors is assigned to gunshot event.

The control panel 508 may be further configured to operate the plurality of notification appliances 504 to emit light in the first color assigned to the gunshot event. The control panel 508 may further provide instructions to the plurality of notification appliances 504 to control (or modulate) one or more characteristics of the emitted light. For example, as shown in FIG. 7A, intensity level of the light emitted by the plurality of notification appliances 504 is controlled to provide direction guidance to the occupants for the evacuation paths. For the sake of illustration, the first color of light emitted by the notification appliances 504A-504K is represented by the first pattern fill P1 and the varying intensity level of light is indicated as gradient of black color in the first pattern fill P1.

With reference to FIG. 7B, the control panel 508 may be configured to dynamically monitor and analyze the sensed data 534 generated by the plurality of sensors 502 subsequent to the occurrence of the detected event. The control panel 508 may detect a spread or shift of the detected event to one or more other locations in the space 702 based on the dynamic monitoring of the sensed data 534. For example, the control panel 508 may analyze the sensed data 534 generated by gunshot sensors and cameras to detect whether gunshots are detected at any other locations in the space. The control panel 508 may further apply object detection and facial recognition algorithms on the sensed data 534 to determine whether the gunshot suspect 708 has moved from the location 706 at which the gunshot was initially detected.

As shown in FIG. 7B, the suspect 708 ran away from the location 706 at which the emergency event was initially detected and followed a movement trajectory 712. In such a scenario, based on the monitoring and analysis of the sensed data 534, the control panel 508 may track a movement trajectory 712 of the suspect 708. The control panel 508 may further determine that the suspect 708 has moved to a new location 714 and is headed towards the exit 704A which was included in a previously generated evacuation path. In such a scenario, the control panel 508 may determine and generate new evacuation paths by avoiding or bypassing the movement trajectory 712 of the suspect 708. In some embodiments, the control panel 508 may update only those evacuation paths that coincide with the movement trajectory 712 of the suspect 708 and may not update those evacuation paths that do not coincide with the movement trajectory 712 of the suspect 708. The control panel 508 may further provide one or more instructions to control the one or more characteristics of the light emitted by the plurality of notification appliances 504. Based on the instructions, the one or more characteristics of the emitted light may be modulated to provide direction guidance for the updated/new evacuation paths. For example, as illustrated in FIG. 7B, the notification appliances 504F and 504G start emitting light in the first color (indicated by the first pattern fill P1) with higher intensity as compared to the intensity level of the light emitted by the same notification appliances 504F and 504G in FIG. 7A. The increase in the intensity level of the emitted light by the notification appliances 504F and 504G may indicate the occupants that the previous evacuation path and the exit 704A are no longer safe. As a result, the occupants may change their movement path to follow the decreasing intensity level of the light. Thus, the dynamic control of the plurality of notification appliances 504 enables the control panel 508 to provide dynamic evacuation guidance.

In some embodiments, the control panel 508 may predict a movement trajectory of the suspect 708 using one or more machine learning models and may pre-emptively update the evacuation paths to bypass the predicted movement trajectory of the suspect 708.

In some other embodiments, the control panel 508 may be configured to temporarily disable those notification appliances 504 that are present in the movement trajectory of the suspect 708 to not warn or alert the suspect 708 of an ongoing evacuation. In some embodiments, when the detected event is a gunshot event, the control panel 508 may determine evacuation paths that lead occupants to an emergency shelter. The emergency shelter may be a safe zone within the space 702.

In some embodiments, the control panel 508 may be further configured to track movement trajectory 712 of the moving suspect 708 and provide current location information of the suspect 708 to one or security personnel or law enforcement agencies.

Figure 8:
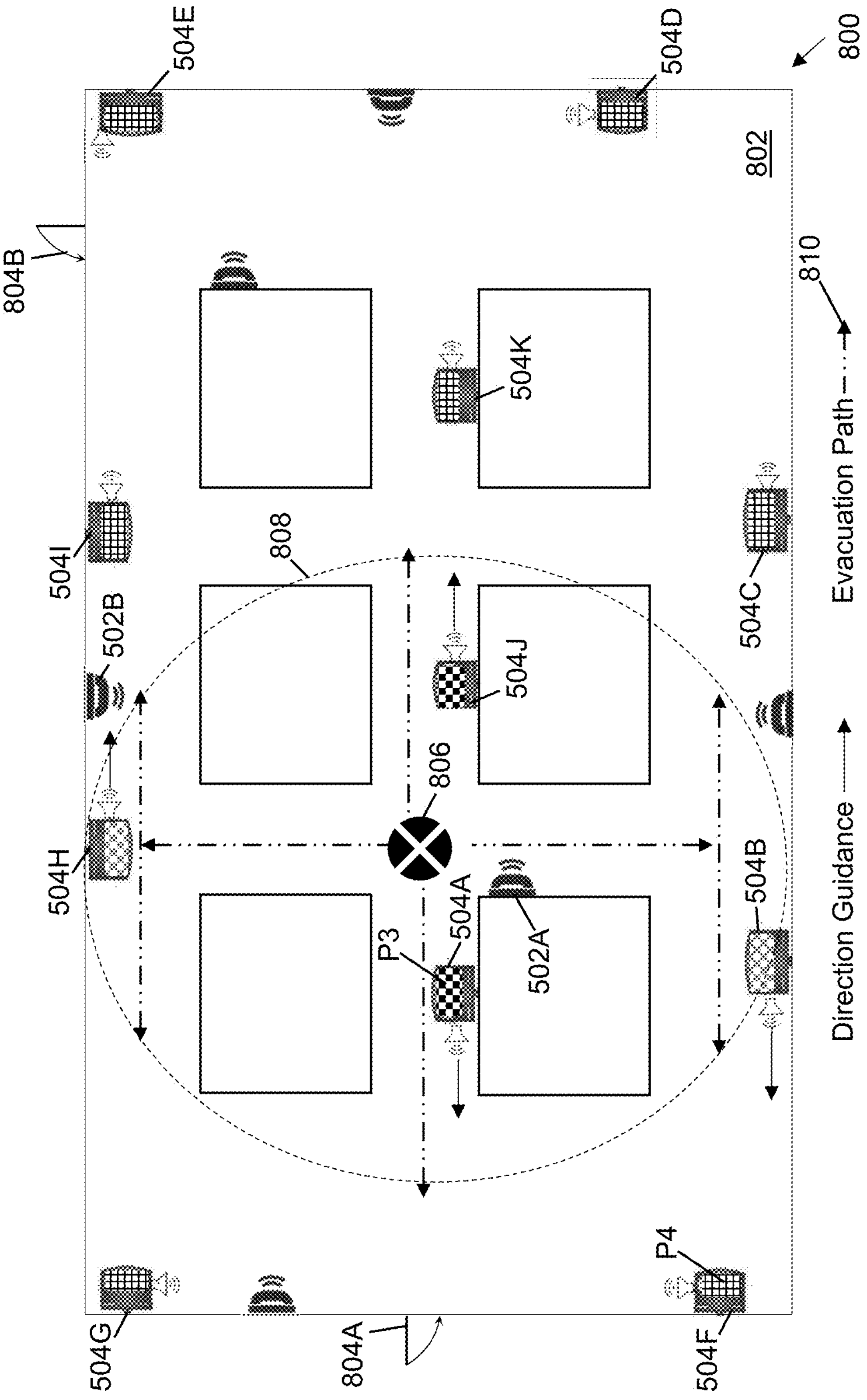
FIG. 8 is a diagram that illustrates an exemplary scenario in which emergency alerts and evacuation guidance are provided using multi-color LED notification appliances, according to some embodiments of the present disclosure.

Referring now to FIG. 8, a diagram that illustrates an exemplary scenario 800 in which emergency alerts and evacuation guidance are provided using multi-color LED notification appliances is shown, according to some embodiments of the present disclosure.

The exemplary scenario 800 illustrates a space 802 that has one or more exits 804A and 804B. The plurality of sensors 502 (for example, sensors 502A, 502B, etc.) and the plurality of notification appliances 504 (e.g., notification appliances 504A-504K) are installed at a plurality of locations in the space 802. For the sake of brevity, only two sensors 502A and 502B are numbered. The plurality of sensors 502 transmit sensed data to the control panel 508 (shown in FIG. 5). The control panel 508 analyzes the received sensed data 534 to detect whether any of the plurality of events has occurred within the space 802, and further determines a location of the detected event. The control panel 508 may further analyze the received sensed data 534 to determine a severity level of the detected event to evaluate whether mass evacuation is required from the space 802, or it would be sufficient to move occupants away from location of the detected event without needing them to exit the space 802.

In an example, based on the sensed data 534 received from the plurality of sensors 502, the control panel 508 (e.g., the event detector 526) may detect that water leakage has occurred at a location 806 in the space 802. Further, the control panel 508 may determine that the detected event has low severity level and does not require the occupants to exit the space 802. In such a scenario, the control panel 508 may determine an unsafe area 808 surrounding the location 806. The unsafe area 808 may correspond to the area from where the occupants are to be evacuated. Area outside the unsafe area 808 may be referred to as safe area. In such a scenario, the control panel 508 (e.g., the path generator 528) may be configured to determine one or more evacuation paths (indicated by arrow types 810) to evacuate occupants from the unsafe area 808 to the safe area. The control panel 508 may further determine which color among the plurality of colors is assigned to water leakage event.

The control panel 508 may further identify those notification appliances that are located within the unsafe area 808. In the exemplary scenario 800, the control panel 50 may determine that the notification appliances 504A, 504B, 504H, and 504J are located within the unsafe area 808. The control panel 508 may operate the notification appliances 504A, 504B, 504H, and 504J that are located within the unsafe area 808 (e.g., an area that is proximal to the location of the detected event) to emit light in the color assigned to the detected event (e.g., the water leakage event) to provide an unsafe area warning. For the sake of illustration, the color of light emitted by the notification appliances 504A, 504B, 504H, and 504J under the control of the control panel 508 is represented by a third pattern fill P3. The control panel 508 may further provide instructions to control one or more characteristics of the light emitted by the notification appliances 504A, 504B, 504H, and 504J that are located within the unsafe area 808. For example, as shown in FIG. 8, intensity level of the light emitted by the notification appliances 504A, 504B, 504H, and 504J is controlled to provide direction guidance to the occupants for evacuating the unsafe area 808. For the sake of illustration, the variation in intensity level of emitted light by the notification appliances 504A-504K is represented as a gradient in black color of the third pattern fill P3. The control panel 508 may further identify those notification appliances that are located outside the unsafe area 808. The control panel 50 may operate those notification appliances 504C, 504D, 504E, 504F, 504G, 504I, and 504K that are located outside the unsafe area 808 to emit light in a color assigned to indicate a safe area (e.g., green color). For the sake of illustration, the green color of light emitted by the notification appliances 504C, 504D, 504E, 504F, 504G, 504I, and 504K under the control of the control panel 508 is represented by a fourth pattern P4.

Thus, when an occupant exits the unsafe area 808 by following the direction guidance provided by the notification appliances 504A, 504B, 504H, and 504J and observes green light emitted by at least one of the notification appliances 504C, 504D, 504E, 504F, 504G, 504I, and 504K, the occupant understands that they have exited the unsafe area 808 and reached the safe area. Further, any occupant who was already in the safe area is not required to evacuate the space 802 based on the green light emitted by the notification appliances 504C, 504D, 504E, 504F, 504G, 504I, and 504K.

Thus, the control panel 508 may programmatically control the color and the one or more characteristics of the light emitted by the plurality of notification appliances 504 to provide emergency event alert, evacuation guidance to the occupants, and an unsafe area warning in areas that are proximal to the location of the detected event.

Referring now to FIGS. 9A-9D, diagrams that illustrate another embodiment of a multi-color LED notification appliance (e.g., any of the plurality of notification appliances 504) are shown, according to some embodiments of the present disclosure.

Figures 9A, 9B, 9C, 9D:
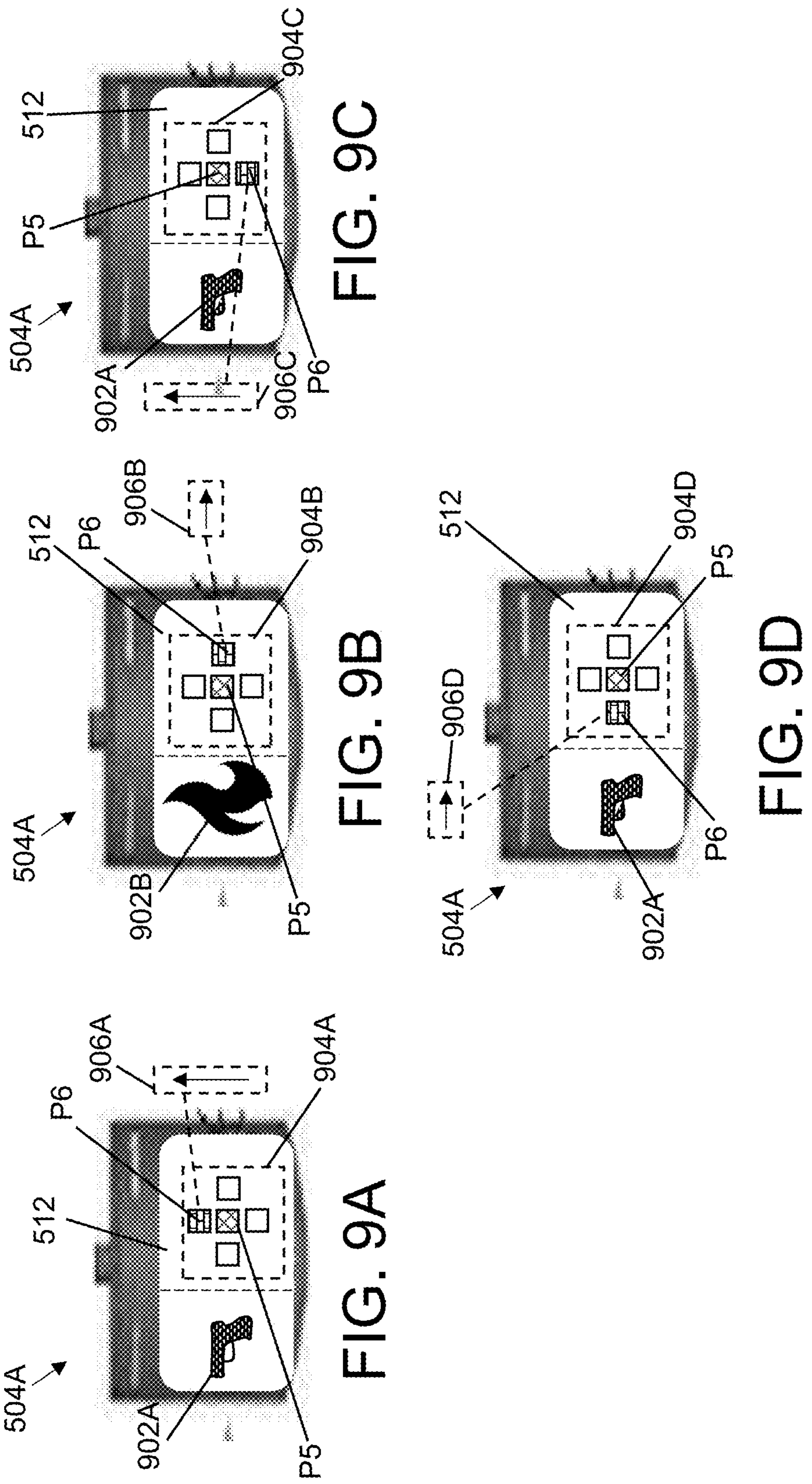
FIGS. 9A, 9B, 9C, and 9D are diagrams that illustrate another embodiment of a multi-color LED notification appliance, according to some embodiments of the present disclosure.

With reference to FIG. 9A, the multi-color LED notification appliance (e.g., the notification appliance 504A) may include the visual indicator 512. The visual indicators 512 may be an RGB light emitting diode (LED) module in which a plurality of red, green, and blue LEDs arranged (for example, in rows and columns, random arrangement, etc.) on a panel. The control panel 508 (shown in FIG. 5) may operate the notification appliance 504A to emit light in a specific color and a specific pattern mapped to the detected event. Different combination of LEDs with different RGB values may be activated to emit light in the desired color (e.g., a first color) while forming the specific pattern. For example, as shown in FIG. 9A, a gun pattern 902A may be formed by emitted light in the first color (e.g., first color is illustratively represented as the pattern fill of the gun pattern 902A) to indicate a gunshot event. The control panel 508 may further operate the notification appliance 504A to additionally emit light in a second color (e.g., red color is illustratively represented as fifth pattern fill P5) indicating the occupants that they are in the unsafe area, and further emit light in a third color (e.g., green color is illustratively represented as sixth pattern fill P6) to provide direction guidance to the occupants in the unsafe area to follow the evacuation paths for exiting the space. The control panel 508 may activate one or more additional LEDs (indicated by dotted box 904A) on the visual indicator 512 to provide unsafe area warning and direction guidance. For example, as shown in FIG. 9A, the control panel 508 may operate the notification appliance 504A to additionally emit light in a pattern indicated by the dotted box 904A. In the pattern indicated by dotted box 904A, the red color light (P5) may indicate that the current location where the notification appliance 504A is placed or installed is unsafe due to the detected emergency event indicated by the pattern in the first color. Further, the green color light (P6) may provide direction guidance 906A for the evacuation path.

With reference to FIG. 9B, a flame pattern 902B is shown to have been formed by emitted yellow color light (illustratively represented as solid black fill) to indicate a fire event. Further, a second pattern indicated by the dotted box 904B is formed on the notification appliance 504A to provide unsafe area warning and direction guidance. The red color light (P5) may indicate that the current location where the notification appliance 504A is placed is unsafe and the green color light (P6) may provide direction guidance 906B for the evacuation path.

With reference to FIG. 9C, a third pattern indicated by the dotted box 904C is formed on the notification appliance 504A to provide unsafe area warning and direction guidance. The red color light (P5) may indicate that the current location where the notification appliance 504A is placed is unsafe and the green color light (P6) may provide direction guidance 906C for the evacuation path.

With reference to FIG. 9D, a fourth pattern indicated by the dotted box 904D is formed on the notification appliance 504A to provide unsafe area warning and direction guidance. The red color light (P5) may indicate that the current location where the notification appliance 504A is placed is unsafe and the green color light (P6) may provide direction guidance 906D for the evacuation path.

Still referring to FIGS. 9A-9D, the plurality of notification appliances 504 may emit light in the first color mapped to the detected event, in the second color (for example, green) to provide evacuation direction guidance to the occupants, and in the third color to indicate the occupants that they are in an unsafe area. Therefore, when an occupant who is in the unsafe area views a nearby notification appliance 504A, the occupant is alerted that they are in an unsafe area where a specific emergency event (indicated by the event color and/or the pattern) has occurred, and they need to evacuate the space following the direction guidance indicated by green color light.

The patterns 902A, 902B, and 904A-904D are merely shown for exemplary purpose and should not be construed to limit the scope of the present disclosure. In other embodiments, other patterns may be formed using the emitted light to indicate the type of event, unsafe area, and direction guidance without deviating from the scope of the disclosure.

In some other embodiments, the plurality of notification appliances 504 may be operated to emit light in green color that forms a pattern or a symbol indicating a direction of movement to follow the evacuation path. For example, if a left turn is to be taken from a location to follow an evacuation path, a notification appliance at that location may be operated to emit green light while forming a left arrow pattern or symbol indicating a direction of movement (e.g., left). Further, the characteristics of the emitted light may be modulated as a function of distance from the detected event to provide accurate direction guidance.

Further, any change and/or update in the evacuation path are also reflected in the green light emitted by the plurality of notification appliances 504. For example, the control panel 508 may operate the plurality of notification appliances 504 to emit green light that provides direction guidance for the new or updated evacuation path instead of the previous or old evacuation paths. In other words, the direction guidance provided by the plurality of notification appliances 504 is updated in response to dynamically changing evacuation paths. Such dynamic control of the plurality of notification appliances 504 in response to the dynamically changing parameters of the space enables the system 500 to provide safest evacuation paths to the occupants.

Figure 10A:
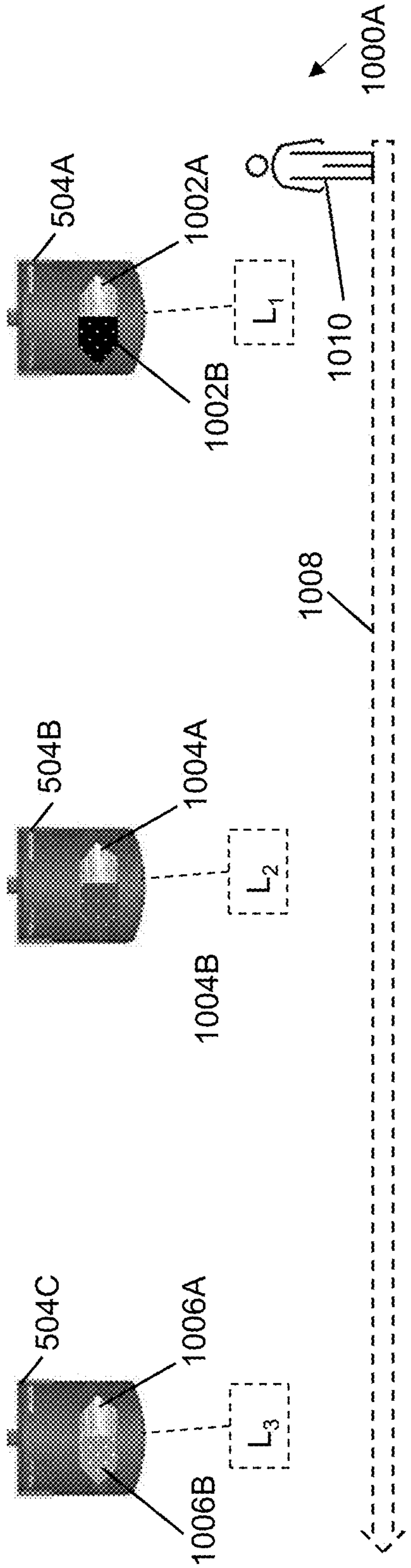
FIGS. 10A and 10B are diagrams that illustrate another embodiment of a multi-color LED notification appliance, according to some embodiments of the present disclosure.
Figure 10B:
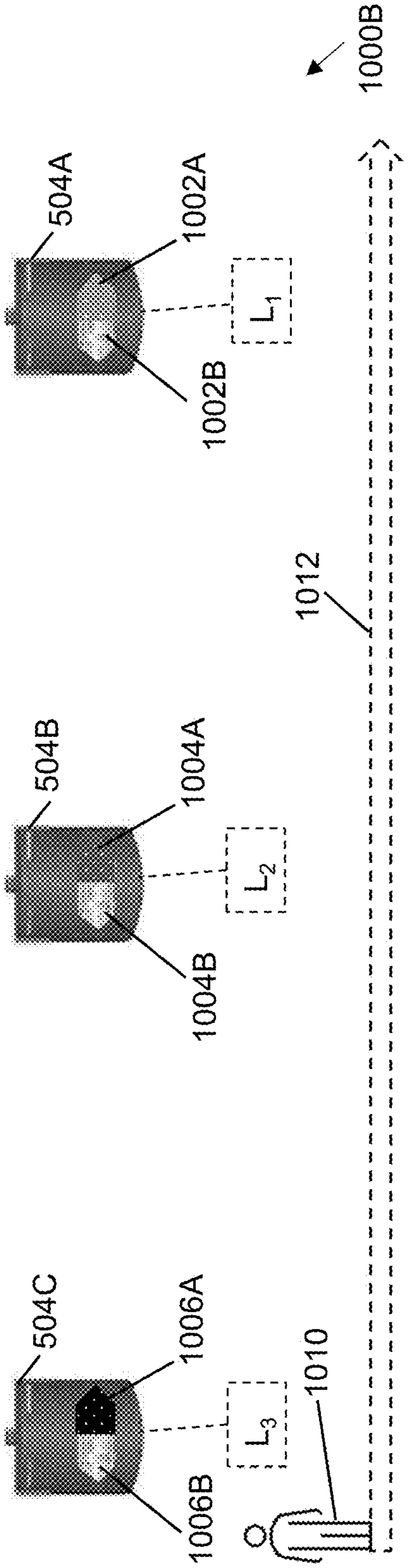

Referring now to FIGS. 10A and 10B, diagrams that illustrate another embodiment of a multi-color LED notification appliance (e.g., any of the plurality of notification appliances 504) are shown, according to some embodiments of the present disclosure.

In FIG. 10A, an exemplary scenario 1000A is shown in which each multi-color LED notification appliance includes two visual indicators each capable of emitting light in the plurality of colors. For example, the multi-color LED notification appliance 504A installed at location $L_1$ includes visual indicators 1002A and 1002B, the multi-color LED notification appliance 504B installed at location $L_2$ includes visual indicators 1004A and 1004B, and the multi-color LED notification appliance 504C installed at location $L_3$ includes visual indicators 1006A and 1006B. The control panel 508 (as shown in FIG. 5) may operate the notification appliances 504A, 504B, 504C to emit light in a specific color mapped to the detected event. At a time-instance when an emergency alert is to be provided, one of the two visual indicators in each notification appliance that points to in a direction of evacuation path is activated to emit light (illustratively represented as black pattern fill) and the other visual indicator remains deactivated. For example, to provide direction guidance for an evacuation path indicated by arrow 1008, the visual indicator 1002B is activated to emit light in a specified color mapped to the detected event and the visual indicator 1002A is deactivated. Similarly, the visual indicator 1004B is activated and the visual indicator 1004A is deactivated in the multi-color LED notification appliance 504B, and the visual indicator 1006B is activated and the visual indicator 1006A is deactivated in the multi-color LED notification appliance 504C. The control panel 508 may further control one or more characteristics (e.g., intensity level, brightness, projection direction, flashing rate, flashing pattern, blinking rate, and/or blinking pattern) of the light emitted by the activated visual indicators 1002B, 1004B, and 1006B to indicate that the evacuation path is leading away from the detected event. An occupant 1010 may follow the direction guidance provided by the multi-color LED notification appliances 504A, 504B, and 504C to evacuate an unsafe area or move away from the detected event.

In FIG. 10B, another exemplary scenario 1000B is shown in which the control panel 508 (as shown in FIG. 5) may operate the notification appliances 504A, 504B, 504C to provide an emergency alert and direction guidance for an evacuation path indicated by arrow 1012. For example, to provide direction guidance for the evacuation path, the visual indicator 1002A is activated to emit light in a specified color (illustratively represented as black pattern fill) mapped to the detected event and the visual indicator 1002B is deactivated. Similarly, the visual indicator 1004A is activated and the visual indicator 1004B is deactivated, and the visual indicator 1006A is activated and the visual indicator 1006B is deactivated. Further, one or more characteristics (e.g., intensity level, brightness, projection direction, flashing rate, flashing pattern, blinking rate, and/or blinking pattern) of the light emitted by the activated visual indicators 1002A, 1004A, and 1006A may be modulated under the control of the control panel 508 to indicate that the evacuation path is leading away from the detected event. The occupant 1010 may follow the direction guidance provided by the multi-color LED notification appliances 504A, 504B, and 504C to evacuate an unsafe area or move away from the detected event.

Figure 11A:
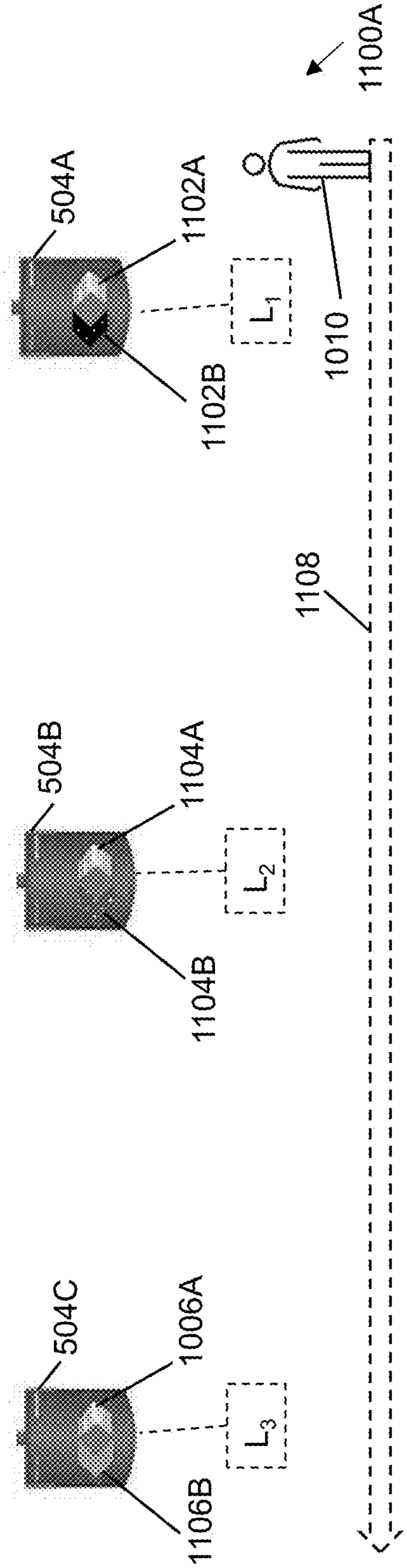
FIGS. 11A and 11B are diagrams that illustrate another embodiment of a multi-color LED notification appliance, according to some embodiments of the present disclosure.
Figure 11B:
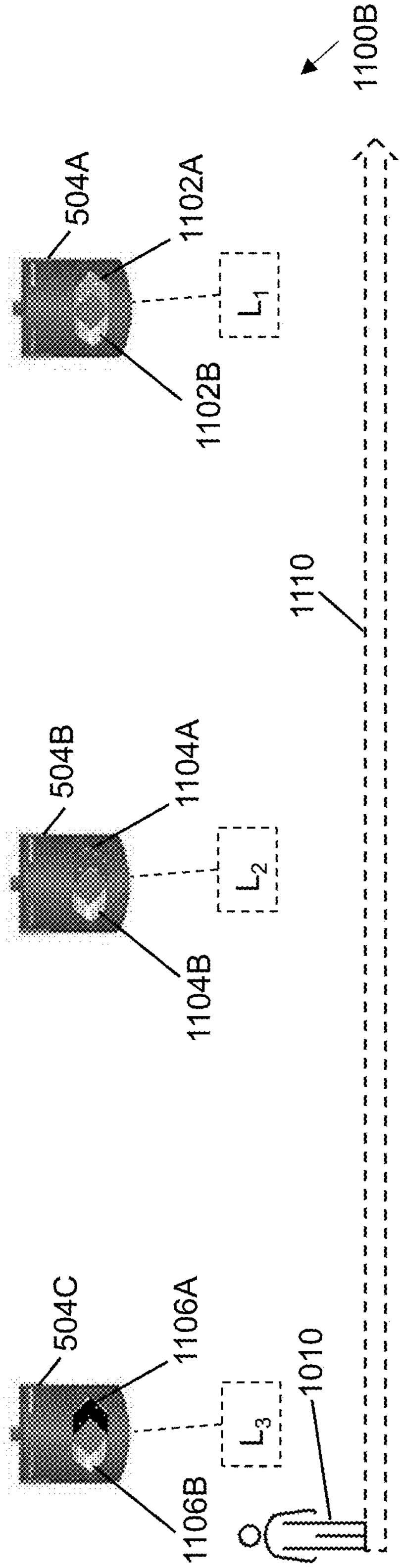

Referring now to FIGS. 11A and 11B, diagrams that illustrate another embodiment of a multi-color LED notification appliance (e.g., any of the plurality of notification appliances 504) are shown, according to some embodiments of the present disclosure.

In FIG. 11A, an exemplary scenario 1100A is shown in which each multi-color LED notification appliance includes two visual indicators each capable of emitting light in the plurality of colors. In some embodiments, the visual indicators may be in the shape of direction signages such as left and right direction signages. For example, the multi-color LED notification appliance 504A installed at location $L_1$ includes a visual indicator 1002A pointing in right direction and another visual indicator 1002B pointing in left direction. Similarly, the multi-color LED notification appliance 504B installed at location $L_2$ includes two visual indicators 1004A and 1004B pointing in right and left directions, respectively, and the multi-color LED notification appliance 504C installed at location $L_3$ includes two visual indicators 1006A and 1006B pointing in right and left direction, respectively. The control panel 508 (as shown in FIG. 5) may operate the notification appliances 504A, 504B, 504C to emit light in a specific color (illustratively represented as black pattern fill) mapped to the detected event. At a time-instance when an emergency alert is to be provided, one of the two visual indicators in each notification appliance that points to in the direction of evacuation path is activated to emit light and the other visual indicator remains deactivated. For example, to provide direction guidance for an evacuation path indicated by arrow 1108, the visual indicator 1102B is activated to emit light in a specified color mapped to the detected event and the visual indicator 1102A is deactivated in the multi-color LED notification appliance 504A. Similarly, the visual indicator 1104B is activated and the visual indicator 1104A is deactivated in the multi-color LED notification appliance 504B, and the visual indicator 1106B is activated and the visual indicator 1106A is deactivated in the multi-color LED notification appliance 504C. The control panel 508 may further control one or more characteristics (e.g., intensity level, brightness, projection direction, flashing rate, flashing pattern, blinking rate, and/or blinking pattern) of the light emitted by the activated visual indicators 1102B, 1104B, and 1106B to indicate that the evacuation path is leading away from the detected event. The occupant 1010 may follow the direction guidance provided by the multi-color LED notification appliances 504A, 504B, and 504C to evacuate an unsafe area or move away from the detected event.

In FIG. 11B, another exemplary scenario 1100B is shown in which the control panel 508 (as shown in FIG. 5) may operate the notification appliances 504A, 504B, 504C to provide an emergency alert and direction guidance for an evacuation path indicated by arrow 1110. For example, to provide direction guidance for the evacuation path, the visual indicator 1102A is activated to emit light in a specified color (illustratively represented as black pattern fill) mapped to the detected event and the visual indicator 1102B is deactivated. Similarly, the visual indicator 1104A is activated and the visual indicator 1104B is deactivated, and the visual indicator 1106A is activated and the visual indicator 1106B is deactivated. Further, one or more characteristics (e.g., intensity level, brightness, projection direction, flashing rate, flashing pattern, blinking rate, and/or blinking pattern) of the light emitted by the activated visual indicators 1102A, 1104A, and 1106A may be modulated under the control of the control panel 508 to indicate that the evacuation path is leading away from the detected event.

Figure 12:
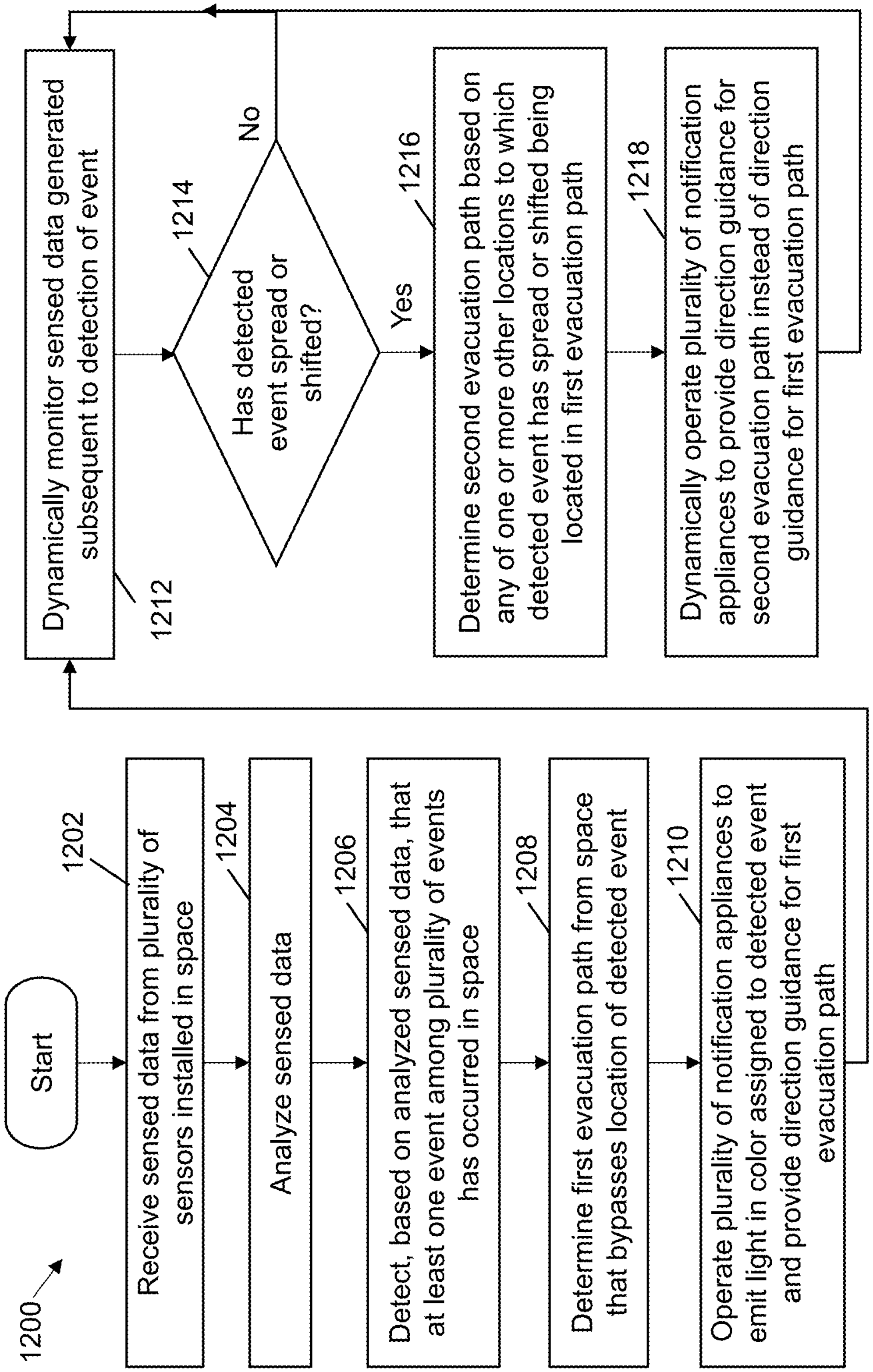
FIG. 12 is a flow chart of a method for providing emergency alerts, according to some embodiments of the present disclosure.

Referring now to FIG. 12, a flow chart of a method 1200 for providing emergency alerts is shown, according to some embodiments of the present disclosure. In some embodiments, operations 1202-1218 of the method 1200 may be performed by one or more components of the system 500 shown in FIG. 5. The illustrated embodiment of the method 1200 is merely an example. Therefore, it should be understood that any of a variety of operations may be omitted, re-sequenced, and/or added while remaining within the scope of the present disclosure.

At 1202, the sensed data 534 is received from the plurality of sensors 502 installed in a space. The control panel 508 may be configured to receive the sensed data 534 from the plurality of sensors 502. Each of the plurality of sensors 502 may be configured to monitor at least one parameter of the space and generate the sensed data 534. Examples of the at least one parameter may include, but are not limited to, temperature, smoke, oxygen levels, pressure, occupancy state, humidity, sound, motion, real-time video, and real-time images.

At 1204, the sensed data 534 is analyzed. The control panel 508 may be configured to analyze the sensed data 534. The control panel 508 may use one or more machine learning algorithms for analyzing the sensed data 534. At 1206, whether at least one event among a plurality of events has occurred in the space is detected based on the analyzed sensed data 534. Based on the analyzed sensed data 534, the control panel 508 may be configured to detect that at least one event among the plurality of events has occurred in the space. Examples of the plurality of events may include, but are not limited to, fire, gunshot, earthquake, flood, oxygen deficiency, gas leak, and breaking and entering. Detection of an occurred event is described in detail in the foregoing description of FIGS. 5-8.

At 1208, a first evacuation path from the space that bypasses a location of the detected event is determined. The control panel 508 may be configured to determine the location of the detected event based on the sensed data 534 and locations of one or more sensors among the plurality of sensors 502 that generated the sensed data 534 related to the detected event. The control panel 508 may be further configured to determine the first evacuation path from the space that bypasses a location of the detected event. The first evacuation path may lead away from the location of the detected event to at least one of a safe shelter and an exit location of the space.

At 1210, the plurality of notification appliances 504 are operated to emit light in a color assigned to the detected event and provide direction guidance for the first evacuation path. Each of the plurality of notification appliances 504 may comprise at least one RGB light emitting diode configured to emit light in a plurality of colors. Each of the plurality of events may be assigned a different color among the plurality of colors for event indication. The color assignment data 536 indicating the mapping of the colors to the events is stored in the memory 524 of the control panel 508. The control panel 508 may be configured to operate the plurality of notification appliances 504 to emit light in the color assigned to the detected event among the plurality of colors and provide the direction guidance for the first evacuation path. The direction guidance for the first evacuation path may be provided by controlling the one or more characteristics of the emitted light. Examples of the one or more characteristics may include, but are not limited to, an intensity level, a blinking rate, a flashing pattern, and a projection direction. The control panel 508 may further operate the plurality of notification appliances 504 to provide an unsafe area warning in areas that are proximal to the location of the detected event. In some embodiments, each of the plurality of notification appliances 504 may be further configured to emit light in the color such that the emitted light forms one of a pattern or a symbol indicating the detected event. In some embodiments, the control panel 508 may further operate the plurality of notification appliances 504 to emit one or more audio outputs in synchronization with the emitted light for direction guidance.

At 1212, the sensed data 534 generated subsequent to the detection of the event is dynamically monitored and analyzed. The control panel 508 may be configured to dynamically monitor and analyze the sensed data 534 generated subsequent to the detection of the event. In some embodiments, the control panel 508 may utilize one or more machine learning algorithms, one or more object detection algorithms, and/or one or more facial recognition algorithms to analyze the sensed data 534.

At 1214, it is determined whether the detected event has spread or shifted to one or more other locations in the space. The control panel 508 may be configured to detect whether the detected event has spread or shifted to one or more other locations in the space. In some embodiments, the control panel 508 may apply one or more prediction models to the dynamically monitored sensed data 534 to predict the spread or shift of the detected event to the one or more other locations in the space. If at 1210, the control panel 508 detects that the detected event has not spread or shifted to one or more other locations, the control passes to 1212. However, if at 1210, the control panel 508 detects that the detected event has spread or shifted to one or more other locations, the control passes to 1216.

At 1216, when any of the one or more other locations to which the detected event has spread or shifted is located in the first evacuation path, a second evacuation path is determined. The control panel 508 may be configured to determine the second evacuation path when any of the one or more other locations to which the detected event has spread or shifted is located in the first evacuation path. The second evacuation path bypasses the one or more other locations to which the detected event has spread or shifted. In some embodiments, the second evacuation path may further bypass the location at which the event was initially detected. In some other embodiments, the second evacuation path may include the location at which the event was initially detected when the detected event has shifted to the one or more other locations and is no longer detectable at the initial location.

At 1218, the plurality of notification appliances 504 are dynamically operated to provide direction guidance for the second evacuation path instead of direction guidance for the first evacuation path. The control panel 508 may be configured to dynamically operate the plurality of notification appliances 504 to provide direction guidance for the second evacuation path instead of direction guidance for the first evacuation path. The control may then pass to 1212. The control may pass to 1202 when detected event is no longer detected in the space.

Figure 13:
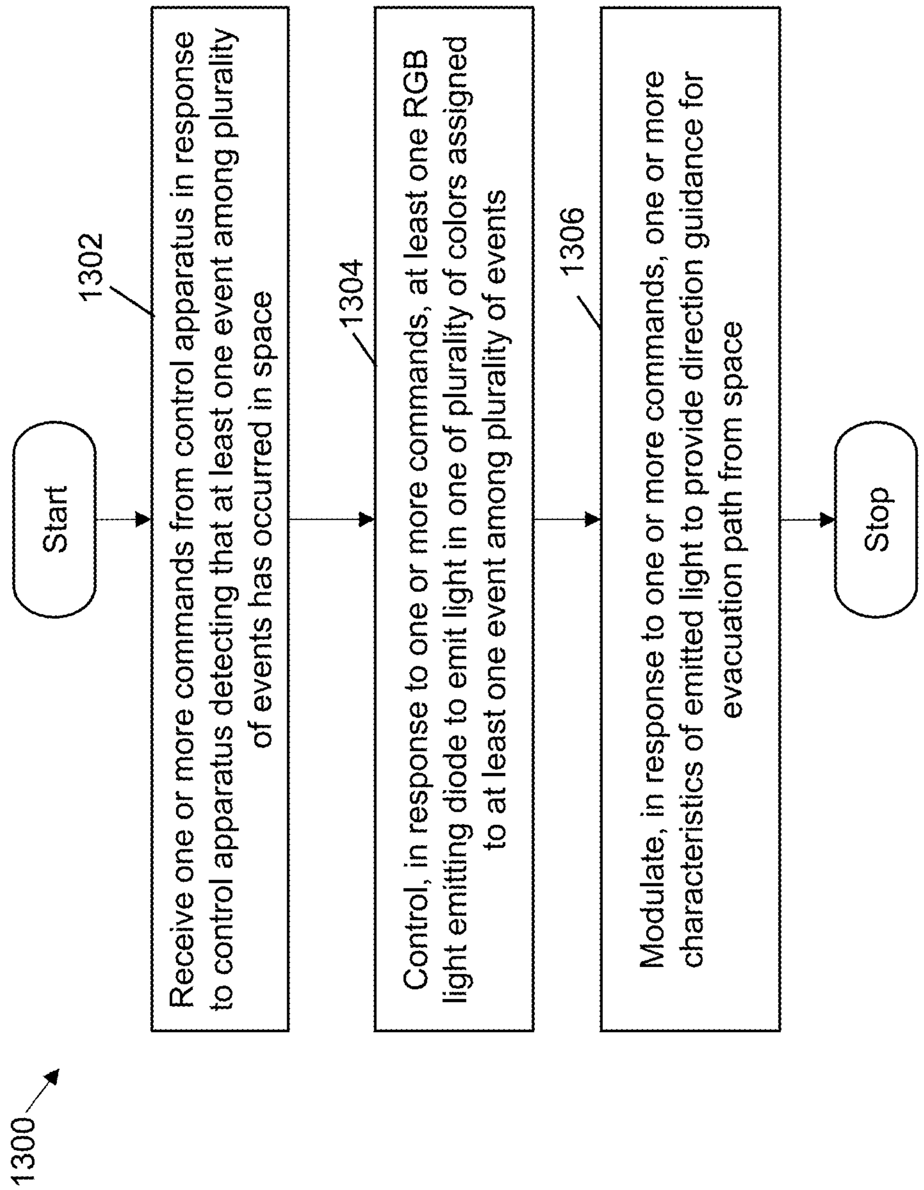
FIG. 13 is a flow chart of a method for providing emergency alerts is shown, according to some embodiments of the present disclosure.

Referring now to FIG. 13, a flow chart of a method 1300 for providing emergency alerts is shown, according to some embodiments of the present disclosure. In some embodiments, operations 1302-1306 of the method 1300 may be performed by each of the plurality of notification appliances 504 of the system 500 shown in FIG. 5. Each of the plurality of notification appliances 504 may correspond to a multi-colored notification appliance that comprises at least one RGB light emitting diode (e.g., the visual indicator 512) operable to emit light in a plurality of colors and the control circuit 515 coupled to the at least one RGB light emitting diode. The illustrated embodiment of the method 1300 is merely an example. Therefore, it should be understood that any of a variety of operations may be omitted, re-sequenced, and/or added while remaining within the scope of the present disclosure.

At 1302, one or more commands are received from a control apparatus (e.g., the control panel 508) in response to the control apparatus detecting that at least one event among a plurality of events has occurred in a space. The control circuit 515 coupled to the at least one RGB light emitting diode may be configured to receive one or more commands from the control panel 508 in response to the control panel 508 detecting that at least one event among the plurality of events (e.g., hazardous or emergency events) has occurred in the space as described in the foregoing description of FIG. 5.

At 1304, in response to the one or more commands, the at least one RGB light emitting diode is controlled to emit light in one of the plurality of colors assigned to the at least one event among the plurality of events. In response to the one or more commands from the control panel 508, the control circuit 515 may be configured to control the at least one RGB light emitting diode to emit light in one of the plurality of colors assigned to the at least one event among the plurality of events as described in the foregoing description of FIG. 5.

At 1306, in response to the one or more commands, one or more characteristics of the emitted light are modulated to provide direction guidance for evacuation path from space. In response to the one or more commands from the control panel 508, the control circuit 515 may be configured to modulate the one or more characteristics of the emitted light to provide direction guidance for an evacuation path from the space as described in the foregoing description of FIG. 5. The control circuit 515 may modulate at least one of an intensity level, a blinking rate, a flashing pattern, brightness level, and a projection direction of the emitted light. In some embodiments, the control circuit 515 may be further configured to control the audio generator 514 (shown in FIG. 5) to emit the one or more audio (or audible) outputs in synchronization with the emitted light for the direction guidance.

Present disclosure offers many technical advancements and advantages. For example, the plurality of notification appliances 504 can be programmatically controlled to emit different colors to indicate different events. Thus, a single notification appliance can be used to indicate multiple emergency events without the need to add multiple LED kits or colored lenses for representing different emergency events. Further, the control panel 508 is able to control each of the plurality of notification appliances 504 individually and independently. Therefore, these plurality of notification appliances 504 can also be used to provide direction guidance for evacuation. Thus, the system 500 not only alerts occupants of a type of emergency event but also provides direction guidance to evacuate an unsafe area. Additionally, the event to color mapping may be programmatically changed by updating the color assignment data 536 stored in the memory 524 of the control panel 508 (for example, a fire alarm control panel). Therefore, any change or update in event to color mapping in safety regulation guidelines can be easily accommodated by updating the color assignment data 536 and without requiring replacing notification appliances.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also, two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A system for providing evacuation path guidance, the system comprising:

sensors, each sensor: at a known location in a space, configured to monitor at least one parameter of the space, and configured to generate sensed data based on the monitored parameter;

notification appliances, each notification appliance: at a know known location in the space, and operable to emit light; and processing circuitry, in communication with each sensor and each notification appliance and configured to:

detect, based on the sensed data, that at least one event among a plurality of event a gunshot event associated with a suspect is occurring at one or more event locations in the space;

determine, based on the detected event and the known location of the sensors, a first evacuation path in the space that bypasses at least one detected event location;

operate the notification appliances to provide direction guidance for the first evacuation path by controlling one or more characteristics of the emitted light, including disabling those notification appliances present in a movement trajectory of the suspect.

2. A method for providing evacuation path guidance, the method comprising:

in processing circuitry, in communication with sensors and notification appliances, each sensor at a known location in a space, configured to monitor at least one parameter of the space, and configured to generate sensed data based on the monitored parameter, each notification appliance at a known location in the space, and operable to emit light:

detecting, based on the sensed data, that a gunshot event associated with a suspect is occurring at one or more event locations in the space;

determining, based on the detected event and the known location of the sensors, a first evacuation path in the space that bypasses at least one detected event location;

operating the notification appliances to provide direction guidance for the first evacuation path by controlling one or more characteristics of the emitted light, including disabling those notification appliances present in a movement trajectory of the suspect.

3. A non-transitory computer-readable medium storing instructions that, when executed by processing circuitry the processing circuitry, in communication with sensors and notification appliances, each sensor at a known location in a space, configured to monitor at least one parameter of the space, and configured to generate sensed data based on the monitored parameter, each notification appliance at a known location in the space, and operable to emit light:

detecting, based on the sensed data, that a gunshot event associated with a suspect is occurring at one or more event locations in the space;

determining, based on the detected event and the known location of the sensors, a first evacuation path in the space that bypasses at least one detected event location;

operating the notification appliances to provide direction guidance for the first evacuation path by controlling one or more characteristics of the emitted light, including disabling those notification appliances present in a movement trajectory of the suspect.

* * * * *